US009905880B2

(12) United States Patent
Mohri et al.

(10) Patent No.: US 9,905,880 B2
(45) Date of Patent: Feb. 27, 2018

(54) FUEL CELL STACK

(71) Applicant: Honda Motor Co., Ltd., Tokyo (JP)

(72) Inventors: Masahiro Mohri, Utsunomiya (JP);
Yasunori Kotani, Utsunomiya (JP);
Masaru Oda, Utsunomiya (JP);
Yasuhiro Watanabe, Minato-ku (JP);
Akihiro Matsui, Utsunomiya (JP);
Keiko Yamazaki, Utsunomiya (JP);
Chikara Iwasawa, Saitama (JP); Hideo Okamoto, Utsunomiya (JP); Masahiro Ise, Utsunomiya (JP); Hiroaki Ohta, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/473,185

(22) Filed: Mar. 29, 2017

(65) Prior Publication Data
US 2017/0207478 A1 Jul. 20, 2017

Related U.S. Application Data

(63) Continuation of application No. 13/144,893, filed as application No. PCT/JP2010/050301 on Jan. 14, 2010, now abandoned.

(30) Foreign Application Priority Data

Jan. 16, 2009 (JP) .................... 2009-008041
Mar. 31, 2009 (JP) .................... 2009-083882

(51) Int. Cl.
*H01M 8/2483* (2016.01)
*H01M 8/2457* (2016.01)
*H01M 8/241* (2016.01)
*H01M 8/04029* (2016.01)
*H01M 8/1006* (2016.01)
*H01M 8/1007* (2016.01)
*H01M 8/1018* (2016.01)
*H01M 8/0206* (2016.01)
*H01M 8/026* (2016.01)

(52) U.S. Cl.
CPC ......... *H01M 8/2483* (2016.02); *H01M 8/026* (2013.01); *H01M 8/0206* (2013.01);
(Continued)

(58) Field of Classification Search
None
See application file for complete search history.

(56) References Cited

U.S. PATENT DOCUMENTS 7,195,837 B2   3/2007 Suzuki et al.
8,034,506 B2  10/2011 Kikuchi et al.
(Continued)

FOREIGN PATENT DOCUMENTS

EP   0896379 A1   2/1999
EP   1995809 A1  11/2008
(Continued)

OTHER PUBLICATIONS

European Supplementary Search Report for Application No. 10731258.9, 9 pages, dated Jun. 13, 2012.
Partial European Search Report for Application No. 13152707.9, 9 pages, dated Jun. 4, 2013.
English translation of JP,2003-323905 Detailed escription.
English translation of JP,2003-323905 Drawings.
(Continued)

*Primary Examiner* — Miriam Stagg
*Assistant Examiner* — Carmen V Lyles-Irving
(74) *Attorney, Agent, or Firm* — Nelson Mullins Riley & Scarborough LLP; Anthony A. Laurentano

(57) ABSTRACT

A fuel cell stack is comprised of a plurality of power generating units which are stacked along the horizontal direction. An oxidant gas inlet port and a fuel gas inlet port are provided in an upper portion of one of the power generating units, and an oxidant gas outlet port and a fuel gas outlet port are provided in the lower portion of the power generating unit. A refrigerant inlet port and a refrigerant outlet port are formed in each of the left and right portions of the power generating unit.

7 Claims, 20 Drawing Sheets

(52) U.S. Cl.
CPC ..... *H01M 8/04029* (2013.01); *H01M 8/1006* (2013.01); *H01M 8/1007* (2016.02); *H01M 8/1018* (2013.01); *H01M 8/241* (2013.01); *H01M 8/2457* (2016.02); *H01M 2008/1095* (2013.01); *H01M 2300/0082* (2013.01)

(56) References Cited

U.S. PATENT DOCUMENTS

| | | | |
|---|---|---|---|
| 2004/0096715 A1* | 5/2004 | Herdtle | H01M 8/04029 |
| | | | 429/435 |
| 2006/0204807 A1 | 9/2006 | Kosaka et al. | |
| 2006/0210855 A1 | 9/2006 | Frank et al. | |
| 2007/0009779 A1 | 1/2007 | Mohri et al. | |

FOREIGN PATENT DOCUMENTS

| | | |
|---|---|---|
| JP | 09-161819 | 6/1997 |
| JP | 11-102721 | 4/1999 |
| JP | 2003-323905 A | 11/2003 |
| JP | 3599280 B2 | 12/2004 |
| JP | 3971969 B2 | 6/2007 |
| JP | 2008-027749 | 2/2008 |
| JP | 2008536258 A | 9/2008 |

OTHER PUBLICATIONS

English translation of JP,2003-323905 Detailed Description.
English Translation of International Search Report for Application No. PCT/JP2010/050301, dated Mar. 16, 2010, 8 pages.

* cited by examiner

FUEL CELL STACK

RELATED APPLICATIONS

This application is a Continuation of U.S. Ser. No. 13/144,893 filed Jul. 15, 2011 which is a 35 U.S.C. 371 national stage filing of International Application No. PCT/JP2010/050301, filed Jan. 14, 2010, which claims priority to Japanese Patent Application No. 2009-008041 filed Jan. 16, 2009, and Japanese Patent Application No. 2009-083882 filed Mar. 31, 2009 in Japan. The contents of the aforementioned applications are hereby incorporated by reference.

TECHNICAL FIELD

The present invention relates to a fuel cell stack formed by stacking a plurality of power generation units together. Each of the power generation units is formed by stacking an electrolyte electrode assembly and a separator. The electrolyte electrode assembly includes a pair of electrodes and an electrolyte interposed between the electrodes.

BACKGROUND ART

For example, a solid polymer electrolyte fuel cell employs an electrolyte membrane. The electrolyte membrane is a polymer ion exchange membrane, and is interposed between an anode and a cathode to form a membrane electrode assembly (MEA). The membrane electrode assembly is sandwiched between a pair of separators, so as to form a power generation unit. In use of the fuel cell of this type, normally, a predetermined number of power generation units are stacked together to form a fuel cell stack.

In the fuel cell, a fuel gas flow field is formed on a surface of one separator facing the anode for supplying a fuel gas to the anode, and an oxygen-containing gas flow field is formed on a surface of the other separator facing the cathode for supplying an oxygen-containing gas to the cathode. Further, a coolant flow field is formed between the adjacent separators for supplying a coolant along surfaces of the separators.

Further, in many cases, this type of fuel cell is constructed as the so-called "internal manifold type fuel cell". In the internal manifold type fuel cell, a fuel gas supply passage and a fuel gas discharge passage for the fuel gas, an oxygen-containing gas supply passage and an oxygen-containing gas discharge passage for the oxygen-containing gas, and a coolant supply passage and a coolant discharge passage for the coolant extend through the power generation units in the stacking direction.

As an internal manifold type fuel cell, for example, a flow field plate as disclosed in Japanese Laid-Open Patent Publication No. 2008-536258 (PCT) is known. As shown in FIG. 19, a hydrogen flow field $2a$ is formed on the surface of an anode flow field plate $1a$. At one end of the anode flow field plate $1a$ in a longitudinal direction indicated by an arrow X, an anode air inlet manifold aperture $3a$, an anode coolant inlet manifold aperture $4a$, and an anode hydrogen inlet manifold aperture $5a$ are formed. At the other end of the anode flow field plate $1a$ in the longitudinal direction, an anode air outlet manifold aperture $3b$, an anode coolant outlet manifold aperture $4b$, and an anode hydrogen outlet manifold aperture $5b$ are formed.

Further, in a fuel cell disclosed in Japanese Laid-Open Patent Publication No. 09-161819, as shown in FIG. 20, a separator $1b$ is provided in contact with the oxidizing agent electrode. A plurality of oxygen-containing gas flow grooves $2b$ are formed on a main surface of the separator $1b$ at the oxidizing agent electrode. Oxygen-containing gas inlets $6a$ are connected to the upstream side of the oxygen-containing gas flow grooves $2b$, and oxygen-containing gas outlets $6b$ are connected to the downstream side of the oxygen-containing gas flow grooves $2b$.

One coolant water inlet $7a$ is formed between a pair of the oxygen-containing gas inlets $6a$ at an upper position of the separator $b1$, and one coolant water outlet $7b$ is formed between a pair of the oxygen-containing gas outlets $6b$. A pair of fuel gas supply passages $8a$ are provided on both sides of an upper portion of the separator $1b$, and a pair of fuel gas discharge passages $8b$ are provided on both sides of a lower portion of the separator $1b$.

SUMMARY OF THE INVENTION

However, in Japanese Laid-Open Patent Publication No. 2008-536258 (PCT), three inlets and three outlets are arranged in a direction indicated by an arrow Y, at both ends in the longitudinal direction, respectively. In the structure, the width of the anode flow field plate $1a$ in the direction indicated by the arrow Y is significantly large, and reduction in the width of the anode flow field plate $1a$ cannot be achieved easily.

Further, in Japanese Laid-Open Patent Publication No. 09-161819, a pair of the oxygen-containing gas inlets $6a$ and a pair of the fuel gas supply passages $8a$ are formed at both sides of the coolant water inlet $7a$ on the upper portion of the separator $1b$. Further, a pair of the oxygen-containing gas outlets $6b$ and a pair of the fuel gas discharge passages $8b$ are provided at both sides of the coolant water outlets $7b$ on the lower portion of the separator $1b$.

Therefore, the width of the separator $1b$ in the direction indicated by the arrow H is significantly large, and the overall size of the unit cell including the separator $1b$ is large disadvantageously.

The present invention has been made to solve the problems of this type, and an object of the present invention is to provide a fuel cell stack having simple structure in which the width of the fuel cell stack is reduced as much as possible, and the desired cooling performance is achieved.

The present invention relates to a fuel cell stack formed by stacking power generation units together. Each of the power generation units is formed by stacking an electrolyte electrode assembly and a metal separator having a rectangular shape in a plan view. The electrolyte electrode assembly includes a pair of electrodes and an electrolyte interposed between the electrodes. In the fuel cell stack, a corrugated gas flow field is formed on a surface of the metal separator facing the electrode for supplying a fuel gas or an oxygen-containing gas as a reactant gas along the electrode. A coolant flow field is formed as a back surface of the corrugated gas flow field, between the power generation units.

In the fuel cell stack, reactant gas supply passages and reactant gas discharge passages for flowing the reactant gases extend through one pair of opposite sides of the metal separator in a stacking direction. A pair of coolant supply passages and a pair of coolant discharge passages for flowing a coolant extend through the other opposite sides of the metal separator in the stacking direction. The pair of the coolant supply passages and the pair of the coolant discharge passages are positioned adjacent to at least the reactant gas supply passages or the reactant gas discharge passages. The pair of the coolant supply passages are disposed separately on the other opposite sides of the metal separator, and the pair of the coolant discharge passages are disposed separately on the other opposite sides of the metal separator.

Further, the present invention relates to a fuel cell stack formed by stacking power generation units together. Each of the power generation units is formed by stacking an electrolyte electrode assembly and a separator having a rectangular shape in a plan view. The electrolyte electrode assembly includes a pair of electrodes and an electrolyte interposed between the electrodes. In the fuel cell stack, a gas flow field is formed on a surface of the separator facing the electrode for supplying a fuel gas or an oxygen-containing gas as a reactant gas along the electrode. A coolant flow field is formed between the power generation units.

Reactant gas supply passages and reactant gas discharge passages for flowing the reactant gases extend through one pair of opposite sides of the separator in a stacking direction. A pair of coolant supply passages and a pair of coolant discharge passages for flowing a coolant extend through the other opposite sides of the separator in the stacking direction. The pair of the coolant supply passages and the pair of the coolant discharge passages are positioned adjacent to at least the reactant gas supply passages or the reactant gas discharge passages, and the pair of the coolant supply passages are disposed separately on the other opposite sides of the separator, while the pair of the coolant discharge passages are disposed separately on the other opposite sides of the separator.

In the present invention, a fuel cell stack is formed by stacking a plurality of power generation units together. Each of the power generation units is formed by stacking an electrolyte electrode assembly and a metal separator having a rectangular shape in a plan view. The electrolyte electrode assembly includes a pair of electrodes and an electrolyte interposed between the electrodes. In the fuel cell stack, reactant gas supply passages and reactant gas discharge passages extend through one pair of opposite sides of the power generation unit in a stacking direction. A coolant supply passage and a coolant discharge passage extend through the other opposite sides of the power generation unit in the stacking direction. The coolant supply passage is positioned adjacent to the reactant gas supply passages, and the coolant discharge passage is positioned adjacent to the reactant gas discharge passages.

Corrugated oxygen-containing gas flow grooves are formed on a surface of one of adjacent metal separators facing the electrode for supplying an oxygen-containing gas as one reactant gas along the electrode, and corrugated fuel gas flow grooves are formed on a surface of the other of the adjacent metal separators facing the electrode for supplying the fuel gas as the other reactant gas along the electrode.

A coolant flow field is formed between the adjacent power generation units by ridges on the back surface of the corrugated oxygen-containing gas flow grooves and ridges on the back surface of the corrugated fuel gas flow grooves. The respective ridges on the back surfaces are set at different phases in an upstream area adjacent to the coolant supply passage and in a downstream area adjacent to the coolant discharge passage, and are set at the same phase in an intermediate area where the flow direction of the coolant is the same as at least the flow direction of the oxygen-containing gas or the fuel gas.

In the present invention, the reactant gas supply passages and the coolant supply passages are not arranged along one side of the separator such as a metal separator or a carbon separator. In the structure, the separator does not become significantly wide or long. In particular, the width of the separator can be reduced as much as possible, and it becomes possible to install the fuel cell stack conveniently.

Further, since the pair of the coolant supply passages are disposed separately while the pair of the coolant discharge passages are disposed separately, the coolant can be supplied uniformly and reliably to the entire coolant flow field. Thus, the uniform moisture environment can be achieved in the entire power generation area, and efficient power generation is performed suitably.

In the present invention, the respective ridges on the back surfaces forming the coolant flow field are set at different phases in the upstream area adjacent to the coolant supply passage and in the downstream area adjacent to the coolant discharge passage. Further, the respective ridges on the back surfaces are set at the same phase in the intermediate area. In the structure, in the intermediate area of the coolant flow field, the flow direction of the coolant is the same as the gas flow direction of at least the oxygen-containing gas or the fuel gas, and the flow direction of the coolant is changed to a direction intersecting the gas flow direction, at positions adjacent to the coolant supply passage and the coolant discharge passage.

Thus, the coolant supply passage and the coolant discharge passage are positioned on different two sides that are different from the two sides of the power generation unit where the oxygen-containing gas supply passage, the fuel gas supply passage, the oxygen-containing gas discharge passage, and the fuel gas discharge passage are provided.

Therefore, since it is not required to arrange these passages in the width direction of the power generation unit, it is possible to provide an internal manifold type fuel cell stack, with a simple structure, where the width of the fuel cell stack can be reduced as much as possible.

Further, the respective ridges on the back surfaces are in the same phase in the intermediate area. Thus, the coolant can be supplied smoothly and reliably in the same direction as the flow direction of at least the oxygen-containing gas or the fuel gas. Accordingly, cooling efficiency of the power generation unit is improved advantageously.

DESCRIPTION OF THE EMBODIMENTS

Figure 1:
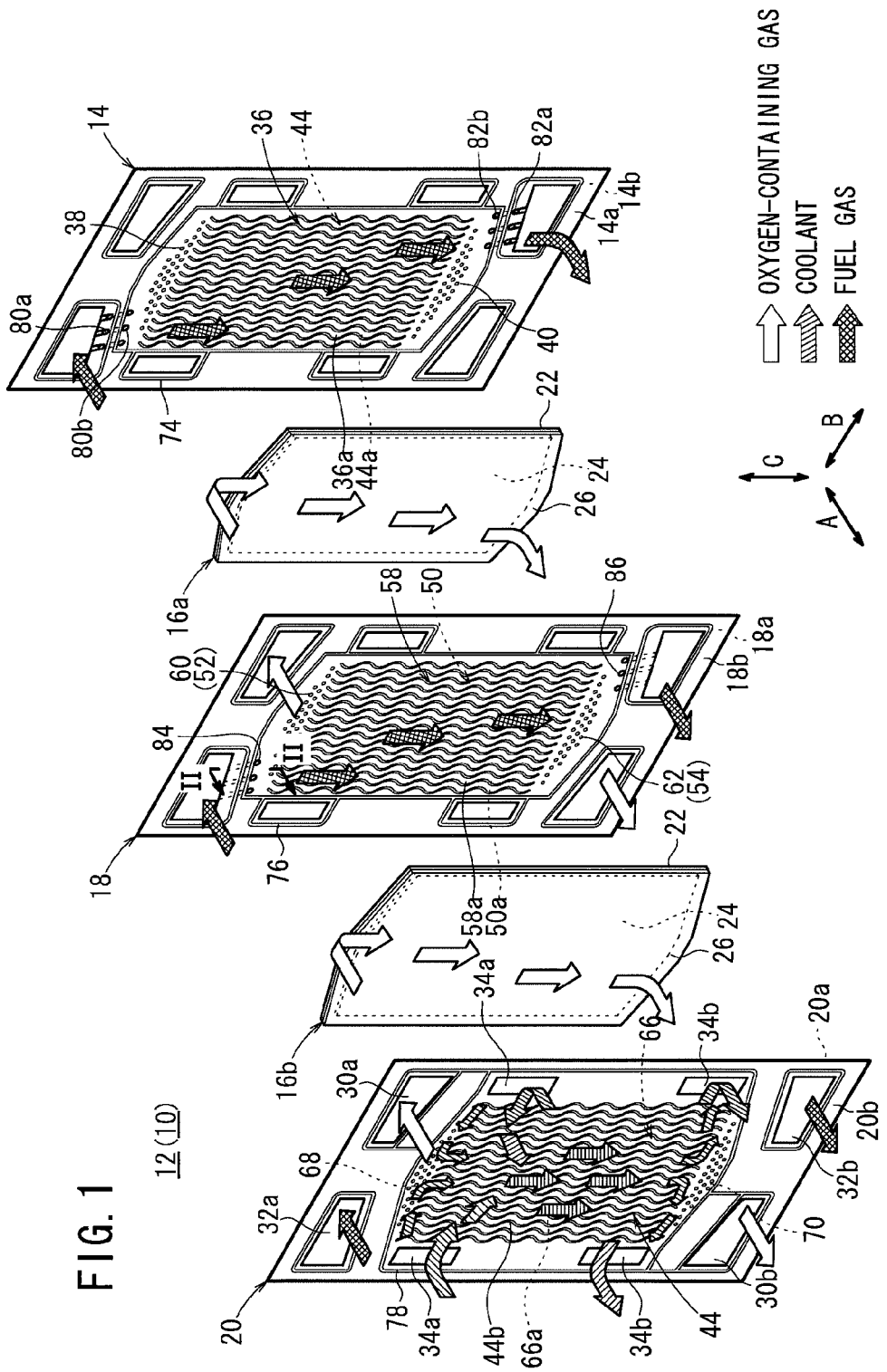
FIG. 1 is an exploded perspective view showing main components of a power generation unit of a fuel cell stack according to a first embodiment of the present invention.
Figure 2:
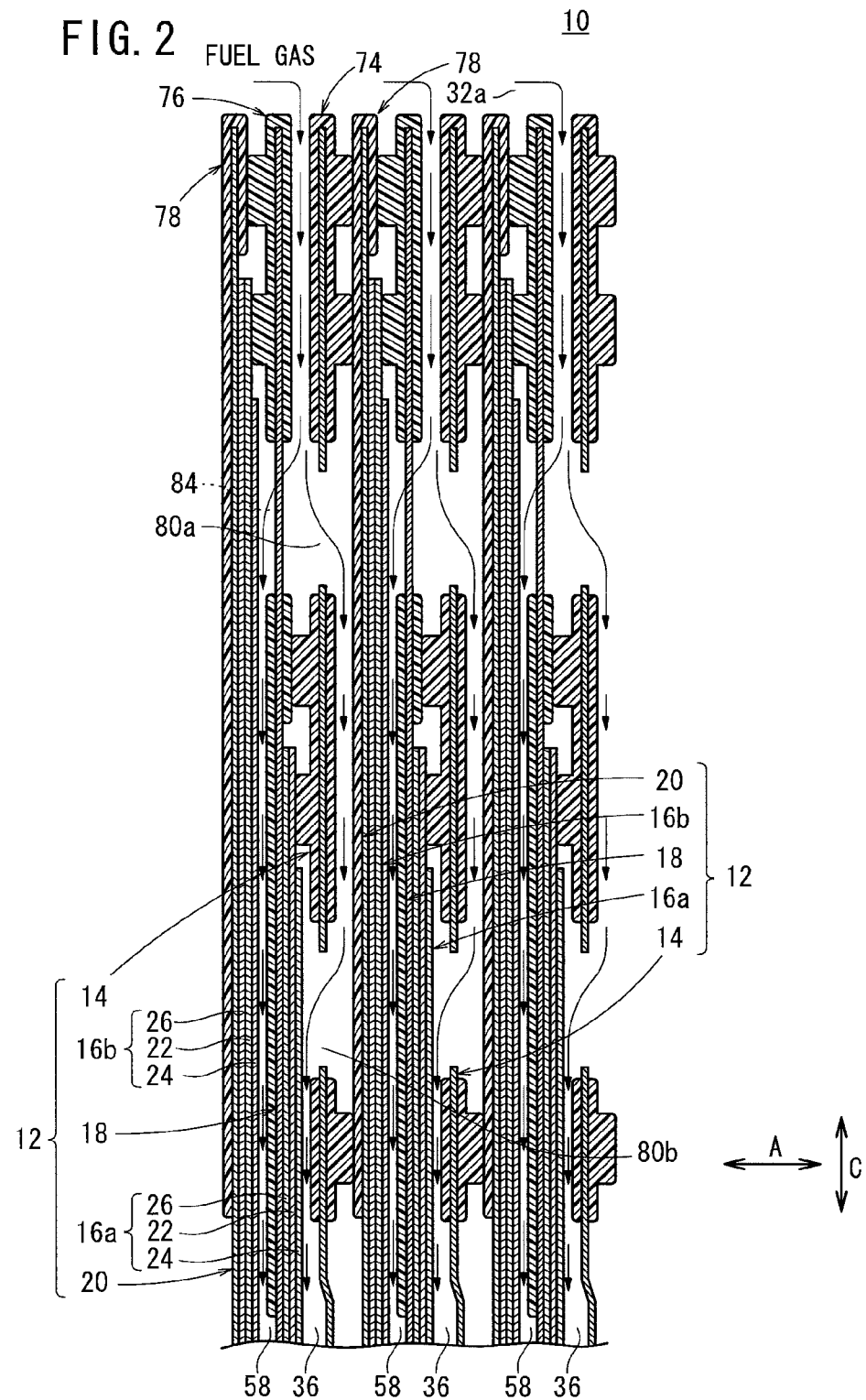
FIG. 2 is a cross sectional view showing the fuel cell stack, taken along a line II-II in FIG. 1.

As shown in FIG. 1, a fuel cell stack 10 according to a first embodiment of the present invention includes a power generation unit 12. A plurality of the power generation units 12 are stacked together in a horizontal direction indicated by an arrow A. As shown in FIGS. 1 and 2, the power generation unit 12 includes a first metal separator 14, a first membrane electrode assembly (electrolyte electrode assembly) 16a, a second metal separator 18, a second membrane electrode assembly 16b, and a third metal separator 20.

For example, the first metal separator 14, the second metal separator 18 and the third metal separator 20 are longitudinally long metal plates, which are made of steel plates, stainless steel plates, aluminum plates, plated steel sheets, or such metal plates having anti-corrosive surfaces formed by carrying out a surface treatment thereon. Each of the first metal separator 14, the second metal separator 18, and the third metal separator 20 has a rectangular shape in a plan view, and has a corrugated shape in cross section, by corrugating metal thin plates by pressure forming.

As shown in FIG. 2, the surface area of the first membrane electrode assembly 16a is smaller than the surface area of the second membrane electrode assembly 16b. Each of the first and second membrane electrode assemblies 16a, 16b includes an anode 24, a cathode 26 and a solid polymer electrolyte membrane 22 interposed between the anode 24 and the cathode 26. The solid polymer electrolyte membrane 22 is formed by impregnating a thin membrane of perfluorosulfonic acid with water, for example. The surface area of the anode 24 is smaller than the surface area of the cathode 26. That is, each of the first and second membrane electrode assemblies 16a, 16b is constructed as the so-called "stepped-type MEA".

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 24 and the electrode catalyst layer of the cathode 26 are fixed to both surfaces of the solid polymer electrolyte membrane 22, respectively.

As shown in FIG. 1, at an upper end portion (i.e., a short side portion) of the power generation unit 12 in the longitudinal direction indicated by an arrow C, an oxygen-containing gas supply passage 30a for supplying an oxygen-containing gas and a fuel gas supply passage 32a for supplying a fuel gas such as a hydrogen-containing gas are provided. The oxygen-containing gas supply passage 30a and the fuel gas supply passage 32a extend through the power generation unit 12 in the direction indicated by the arrow A.

At a lower end portion (i.e., the other short side portion) of the power generation unit 12 in the longitudinal direction indicated by the arrow C, a fuel gas discharge passage 32b for discharging the fuel gas and an oxygen-containing gas discharge passage 30b for discharging the oxygen-containing gas are provided. The fuel gas discharge passage 32b and the oxygen-containing gas discharge passage 30b extend through the power generation unit 12 in the direction indicated by the arrow A.

At both end portions (i.e., long side portions) of the first power generation unit 12 in a lateral direction indicated by an arrow B, a pair of coolant supply passages 34a for supplying a coolant are provided at upper positions, and at both end portions of the first power generation unit 12 in the lateral direction indicated by the arrow B, a pair of coolant discharge passages 34b for discharging the coolant are provided at lower positions. The coolant supply passages 34a and the coolant discharge passages 34b extend through the first power generation unit 12 in the direction indicated by the arrow A. The coolant supply passages 34a and the coolant discharge passages 34b are elongated longitudinally along the long sides of the power generation unit 12.

The coolant supply passages 34a are positioned adjacent to the oxygen-containing gas supply passage 30a and the fuel gas supply passage 32a, and are disposed separately on opposite sides in the direction indicated by the arrow B. The coolant discharge passages 34b are positioned adjacent to the oxygen-containing gas discharge passage 30b and the fuel gas discharge passage 32b, and are disposed separately on the opposite sides in the direction indicated by the arrow B.

Figure 3:
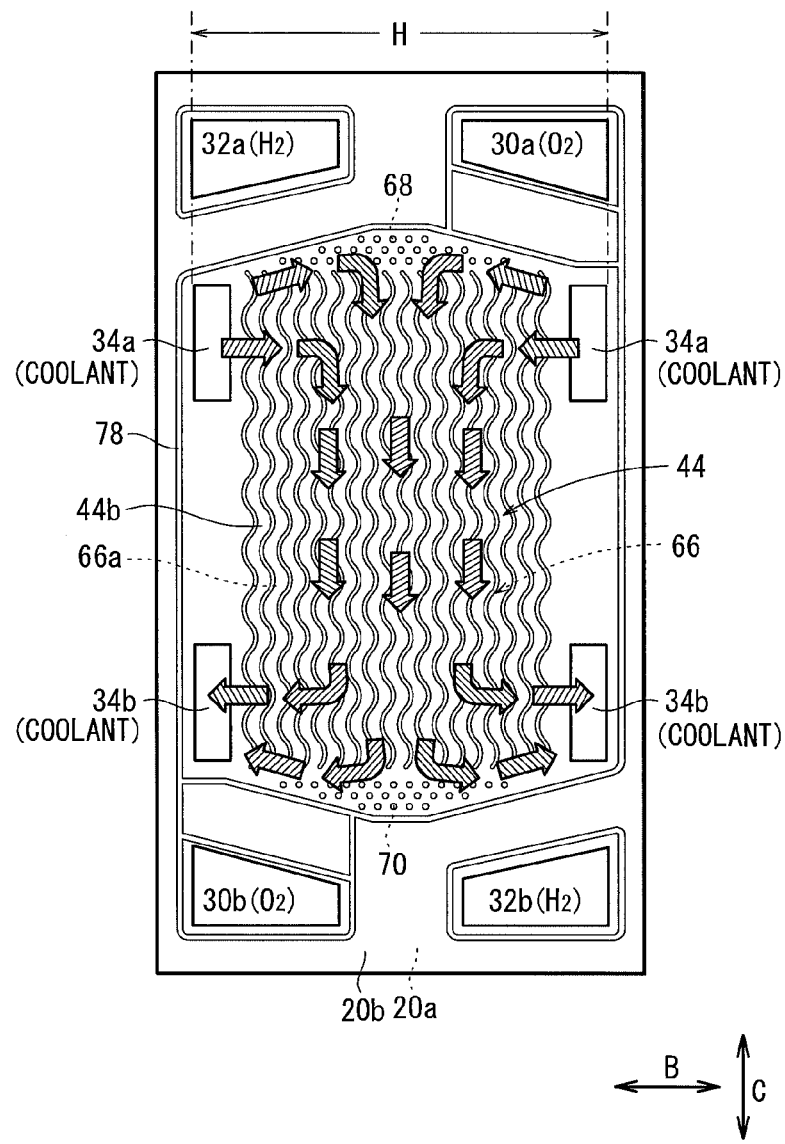
FIG. 3 is a front view showing a third metal separator of the power generation unit.

As shown in FIG. 3, the distance between the outer end of the opening of the oxygen-containing gas supply passage 30a and the outer end of the opening of the fuel gas supply passage 32a in the horizontal direction is defined as a spacing interval H. Further, the distance between the outer end of the opening of the oxygen-containing gas discharge passage 30b and the outer end of the opening of the fuel gas discharge passage 32b in the horizontal direction is defined as the spacing interval H. Preferably, the pair of the coolant supply passages 34a are disposed separately on the opposite sides within the spacing interval H, and the pair of the coolant discharge passages 34b are disposed separately on the opposite sides within the spacing interval H. However, in practical, it is sufficient that the pair of the coolant supply passages 34a and the pair of the coolant discharge passages 34b are provided separately on the opposite sides at an interval which is substantially equal to the spacing interval H.

As shown in FIG. 1, the first metal separator 14 has a first fuel gas flow field 36 on its surface 14a facing the first membrane electrode assembly 16a. The first fuel gas flow field 36 connects the fuel gas supply passage 32a and the fuel gas discharge passage 32b. The first fuel gas flow field 36 includes a plurality of corrugated flow grooves 36a extending in the direction indicated by the arrow C. An inlet buffer 38 and an outlet buffer 40 each having a plurality of bosses are provided near an inlet and an outlet of the first fuel gas flow field 36, respectively.

A coolant flow field 44 is partially formed on a surface 14b of the first metal separator 14. The coolant flow field 44 connects the coolant supply passages 34a and the coolant discharge passages 34b. On the surface 14b, a plurality of corrugated flow grooves 44a are formed as the back surface of the corrugated flow grooves 36a of the first fuel gas flow field 36.

The second metal separator 18 has a first oxygen-containing gas flow field 50 on its surface 18a facing the first membrane electrode assembly 16a. The first oxygen-containing gas flow field 50 connects the oxygen-containing gas supply passage 30a and the oxygen-containing gas discharge passage 30b. The first oxygen-containing gas flow field 50 includes a plurality of corrugated flow grooves 50a extending in the direction indicated by the arrow C. An inlet buffer 52 and an outlet buffer 54 are provided near an inlet and an outlet of the first oxygen-containing gas flow field 50, respectively.

The second metal separator 18 has a second fuel gas flow field 58 on its surface 18b facing the second membrane electrode assembly 16b. The second fuel gas flow field 58 connects the fuel gas supply passage 32a and the fuel gas discharge passage 32b. The second fuel gas flow field 58 includes a plurality of corrugated flow grooves 58a extending in the direction indicated by the arrow C. An inlet buffer 60 and an outlet buffer 62 are provided near an inlet and an outlet of the second fuel gas flow field 58, respectively. The second fuel gas flow field 58 is formed on the back surface of the first oxygen-containing gas flow field 50, and the inlet buffer 60 and the outlet buffer 62 are formed on the back surfaces of the inlet buffer 52 and the outlet buffer 54, respectively.

The third metal separator 20 has a second oxygen-containing gas flow field 66 on its surface 20a facing the second membrane electrode assembly 16b. The second oxygen-containing gas flow field 66 connects the oxygen-containing gas supply passage 30a and the oxygen-containing gas discharge passage 30b. The second oxygen-containing gas flow field 66 includes a plurality of corrugated flow grooves 66a extending in the direction indicated by arrow C. An inlet buffer 68 and an outlet buffer 70 are provided near an inlet and an outlet of the second oxygen-containing gas flow field 66, respectively.

The coolant flow field 44 is partially formed on the surface 20b of the third metal separator 20. On the surface 20b, a plurality of corrugated flow grooves 44b are formed as the back surface of the corrugated flow grooves 66a of the second oxygen-containing gas flow field 66.

In the power generation unit 12, concerning the first fuel gas flow field 36 of the first metal separator 14, the first oxygen-containing gas flow field 50 of the second metal separator 18, and the second fuel gas flow field 58 of the second metal separator 18, the corrugated (wavelike) shapes thereof are set mutually at the same phase along the stacking direction. Further, the wave pitch and amplitude thereof are set the same. Concerning the second oxygen-containing gas flow field 66 of the third metal separator 20, which is arranged at one end of the power generation unit 12 in the stacking direction indicated by the arrow A, the wavelike shape thereof is set mutually at a different phase along the stacking direction from the first fuel gas flow field 36, the first oxygen-containing gas flow field 50, and the second fuel gas flow field 58, while the wave pitch and amplitude thereof are set the same.

As shown in FIGS. 1 and 2, a first seal member 74 is formed integrally on the surfaces 14a, 14b of the first metal separator 14, surrounding the outer circumferential end of the first metal separator 14. Further, the second seal member 76 is formed integrally on the surfaces 18a, 18b of the second metal separator 18, surrounding the outer circumferential end of the second metal separator 18. A third seal member 78 is formed integrally on the surfaces 20a, 20b of the third metal separator 20, surrounding the outer circumferential end of the third metal separator 20.

The first metal separator 14 has a plurality of outer supply holes 80a and inner supply holes 80b connecting the fuel gas supply passage 32a to the first fuel gas flow field 36, and a plurality of outer discharge holes 82a and inner discharge holes 82b connecting the fuel gas discharge passage 32b to the first fuel gas flow field 36.

The second metal separator 18 has a plurality of supply holes 84 connecting the fuel gas supply passage 32a to the second fuel gas flow field 58, and a plurality of discharge holes 86 connecting the fuel gas discharge passage 32b to the second fuel gas flow field 58.

The power generation units 12 are stacked together. Thus, the coolant flow field 44 extending in the direction indicated by the arrow B is formed between the first metal separator 14 of one of the adjacent power generation units 12 and the third metal separator 20 of the other of the adjacent power generation units 12.

Figure 4:
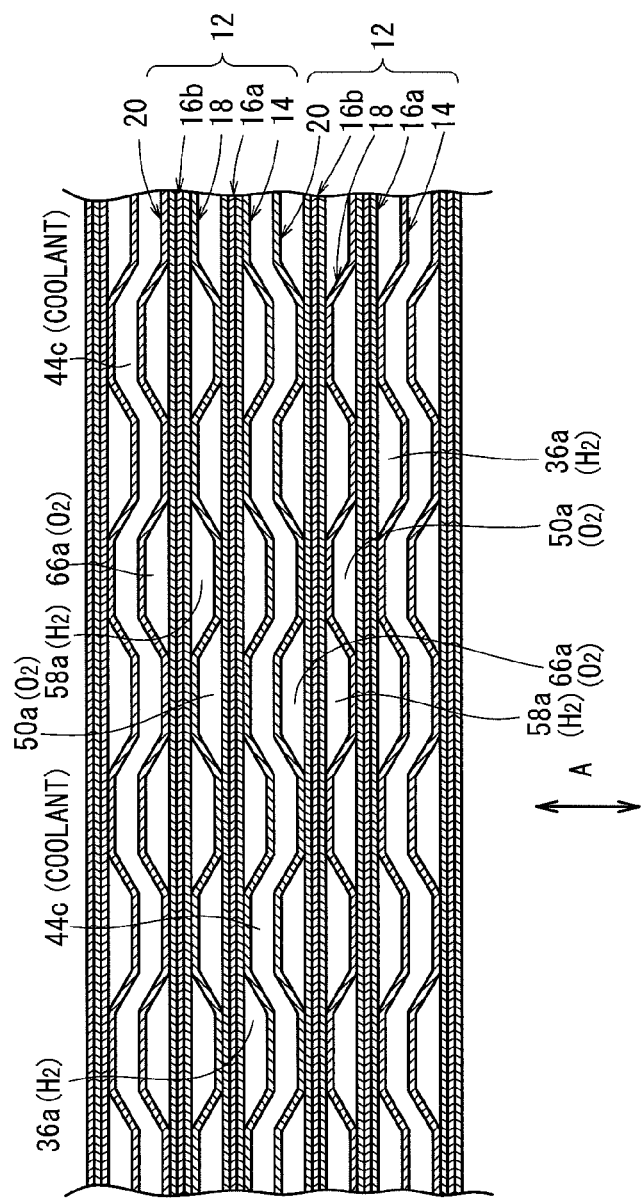
FIG. 4 is a partial cross sectional view showing the fuel cell stack.
Figure 5:
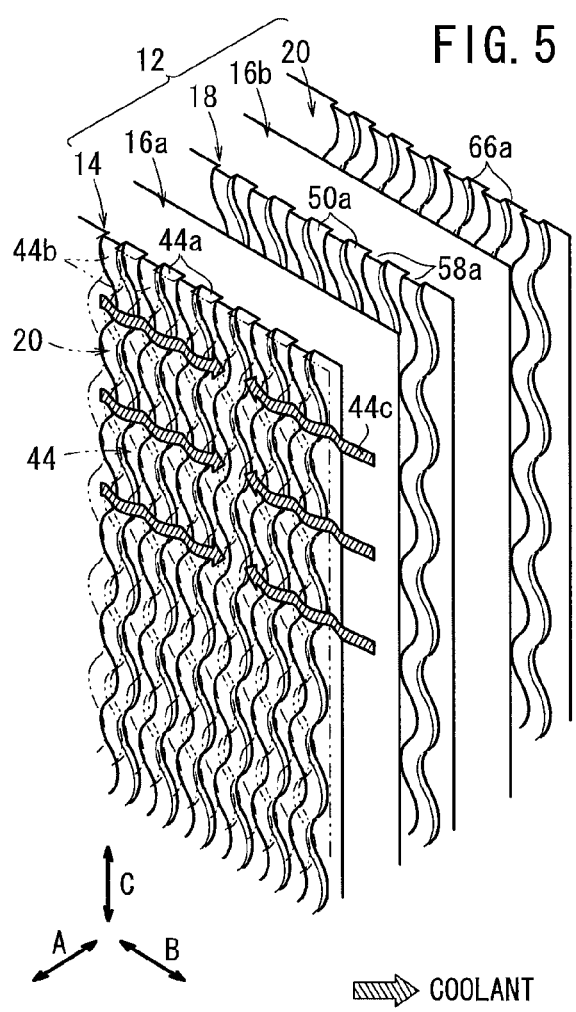
FIG. 5 is a perspective view showing a coolant flow field formed between the power generation units.

In the coolant flow field 44, the corrugated flow grooves 44a and the corrugated flow grooves 44b are set at different phases. By mutually overlapping the corrugated flow grooves 44a and the corrugated flow grooves 44b, a plurality of grooves 44c that communicate in a horizontal direction indicated by the arrow B are formed between the corrugated flow grooves 44a and the corrugated flow grooves 44b (FIGS. 4 and 5). The coolant flow field 44 is configured to allow the coolant to flow across the back surfaces of the inlet buffer 38, the outlet buffer 40, the inlet buffer 68, and the outlet buffer 70.

Operation of the fuel cell stack 10 having the structure will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol, or oil is supplied to the coolant supply passages 34a.

Thus, the oxygen-containing gas from the oxygen-containing gas supply passage 30a flows into the first oxygen-containing gas flow field 50 of the second metal separator 18 and the second oxygen-containing gas flow field 66 of the third metal separator 20. The oxygen-containing gas moves along the first oxygen-containing gas flow field 50 in the direction of gravity indicated by the arrow C, and the oxygen-containing gas is supplied to the cathode 26 of the first membrane electrode assembly 16a. Further, the oxygen-containing gas moves along the second oxygen-containing gas flow field 66 in the direction indicated by the arrow C, and the oxygen-containing gas is supplied to the cathode 26 of the second membrane electrode assembly 16b.

As shown in FIG. 2, the fuel gas from the fuel gas supply passage 32a flows through the outer supply holes 80a toward the surface 14b of the first metal separator 14. Further, the fuel gas from the inner supply holes 80b moves toward the surface 14a, and then, the fuel gas moves along the first fuel gas flow field 36 in the direction of gravity indicated by the arrow C. The fuel gas is thus supplied to the anode 24 of the first membrane electrode assembly 16*a* (see FIG. 1).

Further, as shown in FIG. 2, the fuel gas flows through the supply holes 84 toward the surface 18*b* of the second metal separator 18. Thus, as shown in FIG. 1, the fuel gas moves along the second fuel gas flow field 58 on the surface 18*b* in the direction indicated by the arrow C. The fuel gas is thus supplied to the anode 24 of the second membrane electrode assembly 16*b*.

Thus, in each of the first and second membrane electrode assemblies 16*a*, 16*b*, the oxygen-containing gas supplied to the cathode 26 and the fuel gas supplied to the anode 24 are consumed in the electrochemical reactions at electrode catalyst layers of the cathode 26 and the anode 24 for generating electricity.

The oxygen-containing gas consumed at each of the cathodes 26 of the first and second membrane electrode assemblies 16*a*, 16*b* is discharged along the oxygen-containing gas discharge passage 30*b* in the direction indicated by the arrow A.

The fuel gas consumed at the anode 24 of the first membrane electrode assembly 16*a* flows through the inner discharge holes 82*b*, and then, the fuel gas moves to the surface 14*b*. After the fuel gas moves to the surface 14*b*, the fuel gas flows through the outer discharge holes 82*a*, and again, the fuel gas moves to the surface 14*a*. Then, the fuel gas is discharged to the fuel gas discharge passage 32*b*.

The fuel gas supplied to and consumed at the anode 24 of the second membrane electrode assembly 16*b* flows through the discharge holes 86 toward the surface 18*a*. Then, the fuel gas is discharged into the fuel gas discharge passage 32*b*.

As shown in FIG. 3, the coolant supplied to the pair of left and right coolant supply passages 34*a* flows into the coolant flow field 44 formed between the first metal separator 14 of one of the adjacent power generation units 12 and the third metal separator 20 of the other of the adjacent power generation units 12.

The pair of the coolant supply passages 34*a* are disposed separately at the left and right ends on the upper portion of the power generation unit 12, and are positioned adjacent to the oxygen-containing gas supply passage 30*a* and the fuel gas supply passage 32*a*.

In the structure, substantially the same amount of coolant is supplied from each of the coolant supply passages 34*a* to the coolant flow field 44 toward each other, in the direction indicated by the arrow B. The flows of coolant from the coolant supply passages 34*a* meet at the center of the coolant flow field 44 in the direction indicated by the arrow B. Then the coolant moves in the direction of gravity (toward the lower side in the direction indicated by the arrow C), and substantially the same amount of the coolant is discharged into each of the coolant discharge passages 34*b* disposed separately on opposite sides of the lower portion of the power generation unit 12.

As described above, in the first embodiment, the pair of left and right coolant supply passages 34*a* extend through upper positions of the power generation units 12, and the pair of left and right coolant discharge passages 34*b* extend through the lower positions of the power generation units 12. Therefore, the coolant can move in a vertically downward direction over the entire area of the coolant flow field 44. In the structure, it becomes possible to control the temperature distribution utilizing a temperature gradient in the coolant flow field 44, whereby uniform cooling efficiency can be maintained.

Further, in the first embodiment, the oxygen-containing gas supply passage 30*a* and the fuel gas supply passage 32*a*, and the oxygen-containing gas discharge passage 30*b* and the fuel gas discharge passage 32*b* are provided on upper and lower opposite sides of the power generation unit 12, respectively. The pair of coolant supply passages 34*a* are disposed separately on the left and right opposite sides of the power generation unit 12, while the pair of coolant discharge passages 34*b* are disposed separately on the left and right opposite sides of the power generation unit 12.

In the structure, the width of the power generation unit 12 in the direction indicated by the arrow B is reduced effectively. In particular, the coolant supply passages 34*a* and the coolant discharge passages 34*b* are disposed within the area of the spacing interval H in the horizontal direction (indicated by the arrow B) between the oxygen-containing gas supply passage 30*a* (oxygen-containing gas discharge passage 30*b*) and the fuel gas supply passage 32*a* (fuel gas discharge passage 32*b*), or disposed at an interval that is substantially equal to the spacing interval H. In the structure, the width of the power generation unit 12 can be reduced as much as possible.

Further, in the first embodiment, the coolant flows through the coolant flow field 44 in the direction of gravity, i.e., in parallel to the direction in which the oxygen-containing gas flows through the second oxygen-containing gas flow field 66 on the back surface of the coolant flow field 44. In the structure, since the temperature at the upstream side of the second oxygen-containing gas flow field 66 decreases with increasing flow rate of the coolant, the highly humidified area is expanded, and the resistance overpotential is reduced.

On the downstream side of the second oxygen-containing gas flow field 66 (and the first oxygen-containing gas flow field 50), heated coolant is supplied, and then the temperature is increased. Therefore, vaporization of the water produced in the power generation reaction is facilitated, and flooding is suppressed. Thus, reduction in the concentration overpotential is achieved. In the structure, improvement in the output and durability of the power generation unit 12 is achieved. Further, the uniform humidification environment from the upstream side to the downstream side of the second oxygen-containing gas flow field 66 (and the first oxygen-containing gas flow field 50) is achieved, and water swelling of the solid polymer electrolyte membrane 22 becomes uniform. Moreover, deflection of the stack is suppressed.

Further, in the first embodiment, in the coolant flow field 44, the coolant flows on the back surfaces of the inlet buffer 38, the outlet buffer 40, the inlet buffer 68, and the outlet buffer 70. In the structure, since the coolant flows in the direction of gravity through the back surfaces of the buffers, the flow of the coolant is distributed uniformly in the coolant flow field 44, and it becomes possible to cool the power generation area suitably.

Further, since the coolant flows also into the areas on the back surfaces of the outlet buffers 40, 70, the temperature becomes high at the downstream side of the second oxygen-containing gas flow field 66 (and the first oxygen-containing gas flow field 50) where no power generation is performed. Thus, the temperature difference between the non-power-generation area and the power-generation area is reduced, whereby water condensation can be suppressed suitably.

Though the first embodiment has been described in the case of using the power generation unit 12 having the first metal separator 14, the first membrane electrode assembly 16*a*, the second metal separator 18, the second membrane electrode assembly 16*b*, and the third metal separator 20, the present invention is not limited in this respect. For example, a power generation unit formed by sandwiching one electrolyte electrode assembly between a pair of metal separators may be used, and the coolant flow field may be formed between the adjacent power generation units.

In the first embodiment, the oxygen-containing gas supply passage 30a and the fuel gas supply passage 32a are provided at the upper end portion of the power generation unit 12, while the oxygen-containing gas discharge passage 30b and the fuel gas discharge passage 32b are provided at the lower end portion of the power generation unit 12. Conversely, the oxygen-containing gas discharge passage 30b and the fuel gas discharge passage 32b may be provided at the upper end portion of the power generation unit 12, while the oxygen-containing gas supply passage 30a and the fuel gas supply passage 32a may be provided at the lower end portion of the power generation unit 12.

Further, a pair of the coolant supply passages 34a are provided at both ends in the lateral direction on the upper portion of the power generation unit 12—while a pair of the coolant discharge passages 34b are provided at both ends in the lateral direction on the lower portion of the power generation unit 12. Conversely, the pair of coolant discharge passages 34b may be provided at both ends in the lateral direction on the upper portion of the power generation unit 12, and a pair of coolant supply passages 34a may be provided at both ends in the lateral direction on the lower portion of the power generation unit 12.

The above also applies to second to fourth embodiments of the present invention, to be described below.

Figure 6:
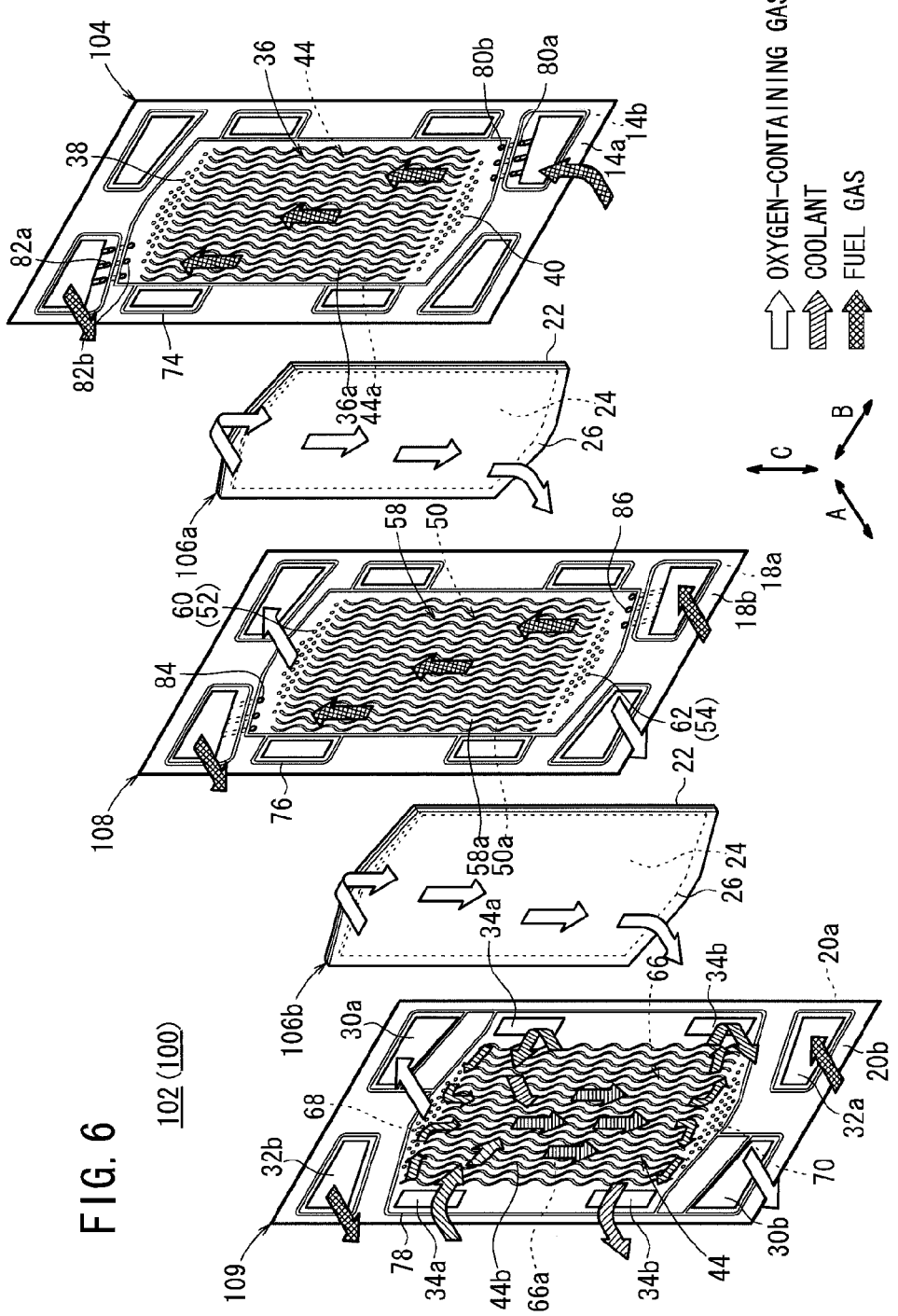
FIG. 6 is an exploded perspective view showing main components of a fuel cell stack according to a second embodiment of the present invention.

FIG. 6 is an exploded perspective view showing main components of a power generation unit 102 of a fuel cell stack 100 according to a second embodiment of the present invention.

The constituent elements of the fuel cell stack 100 that are identical to those of the fuel cell stack 10 according to the first embodiment are labeled with the same reference numerals, and detailed descriptions thereof will be omitted. Also in third and other embodiments as described later, the constituent elements that are identical to those of the fuel cell stack 10 according to the first embodiment are labeled with the same reference numerals, and detailed descriptions thereof will be omitted.

The power generation unit 102 includes a first metal separator 104, a first membrane electrode assembly 106a, a second metal separator 108, a second membrane electrode assembly 106b, and a third metal separator 109.

An oxygen-containing gas supply passage 30a and a fuel gas discharge passage 32b extend through the power generation unit 102 at upper end positions in the longitudinal direction. An oxygen-containing gas discharge passage 30b and a fuel gas supply passage 32a extend through the power generation unit 102 at lower end positions in the longitudinal direction.

In the power generation unit 102, the oxygen-containing gas flows in the first and second oxygen-containing gas flow fields 50, 66 in the direction of gravity, while the fuel gas flows in the first and second fuel gas flow fields 36, 58 in the direction opposite to gravity, i.e., in the direction opposite to the flow direction of the oxygen-containing gas. In the second embodiment, the oxygen-containing gas and the fuel gas flow in a counterflow manner. Further, the same advantages as in the case of the first embodiment are obtained.

Figure 7:
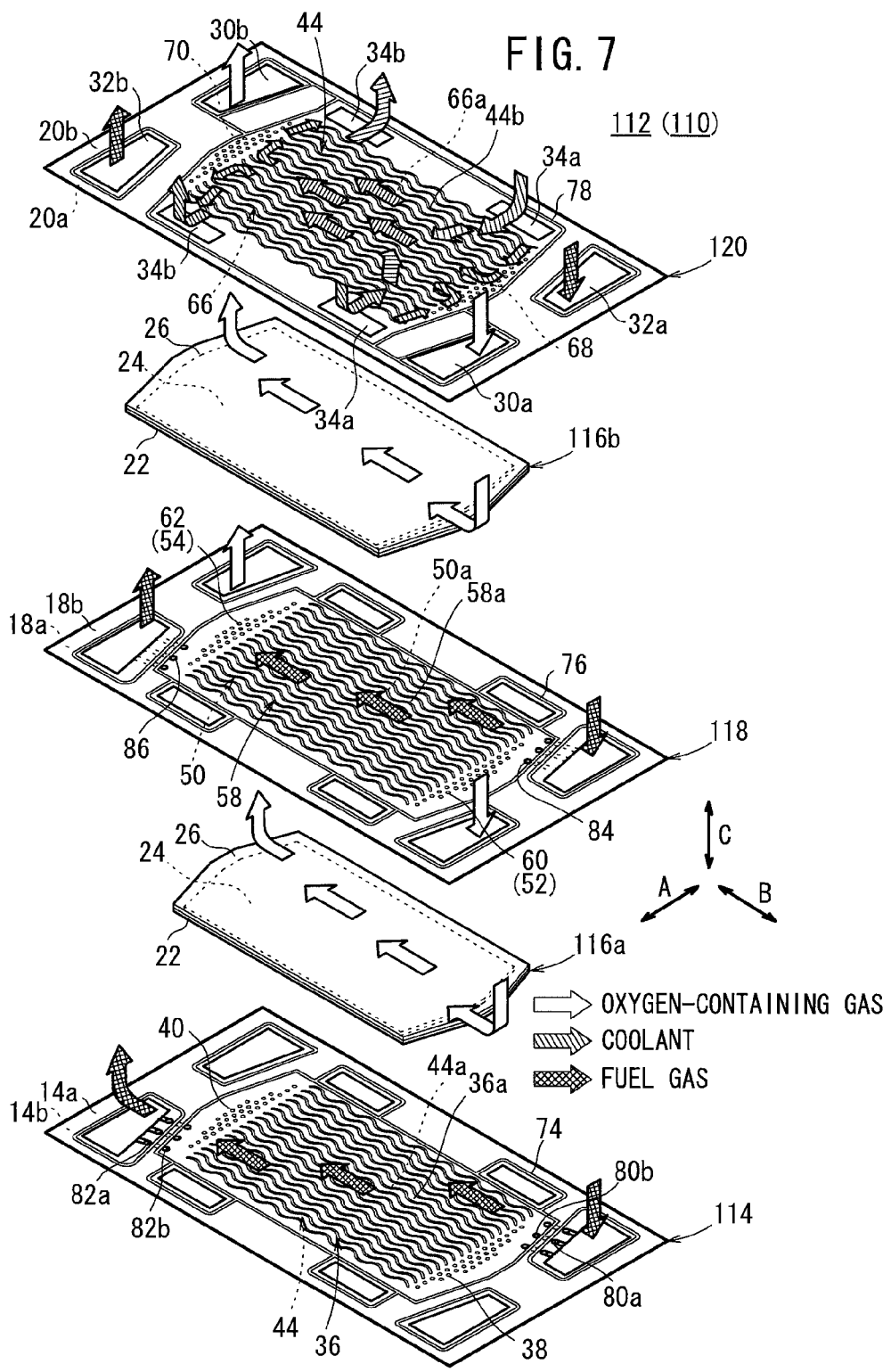
FIG. 7 is an exploded perspective view showing main components of a fuel cell stack according to a third embodiment of the present invention.

FIG. 7 is an exploded perspective view showing main components of a power generation unit 112 of a fuel cell stack 110 according to a third embodiment of the present invention.

The power generation unit 112 is formed by stacking a first metal separator 114, a first membrane electrode assembly 116a, a second metal separator 118, a second membrane electrode assembly 116b, and a third metal separator 120 in the direction of gravity.

In the third embodiment, the width of the power generation unit 112 in the direction indicated by the arrow A is reduced as much as possible. In a state where a plurality of power generation units 112 are stacked together in the direction of gravity, the width of the fuel cell stack 110 is reduced. Further, the same advantages as in the case of the first and second embodiments are obtained. It should be noted that the oxygen-containing gas and the fuel gas may flow in a counterflow manner as in the case of the second embodiment.

Figure 8:
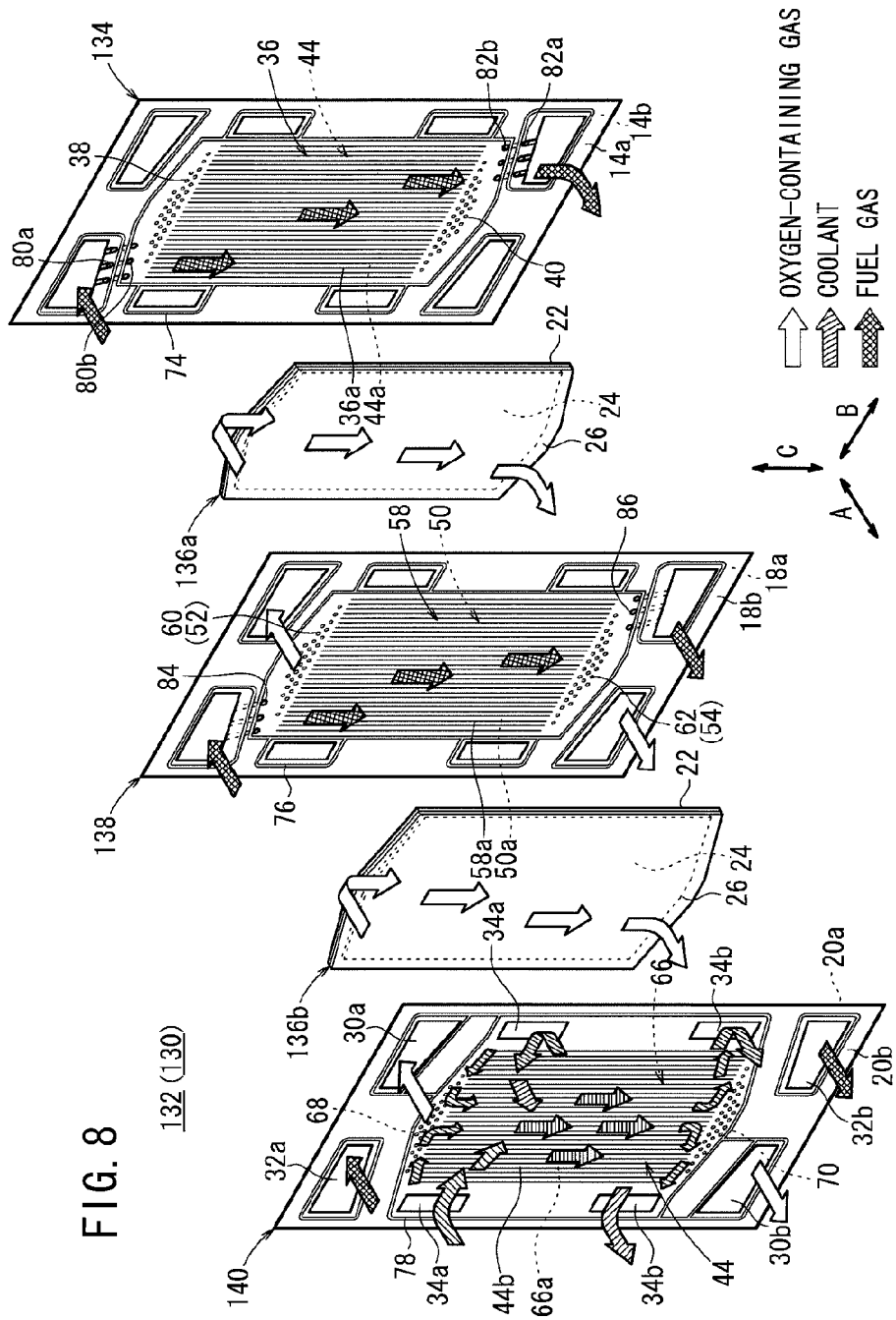
FIG. 8 is an exploded perspective view showing main components of a fuel cell stack according to a fourth embodiment of the present invention.

FIG. 8 is an exploded perspective view showing main components of a power generation unit 132 of a fuel cell stack 130 according to a fourth embodiment of the present invention.

The power generation unit 132 includes a first carbon separator 134, a first membrane electrode assembly 136a, a second carbon separator 138, a second membrane electrode assembly 136b, and a third carbon separator 140.

The power generation units 132 are stacked in a horizontal direction indicated by an arrow A. Alternatively, the power generation units 132 may be stacked in a vertical direction indicated by an arrow C as in the case of the third embodiment. The reactant gas flow field includes straight flow grooves instead of the corrugated flow grooves.

In the fourth embodiment, instead of the metal separators, the first carbon separator 134, the second carbon separator 138, and the third carbon separator 140 are used. Further, the same advantages as in the case of the first to third embodiments are obtained.

Figure 9:
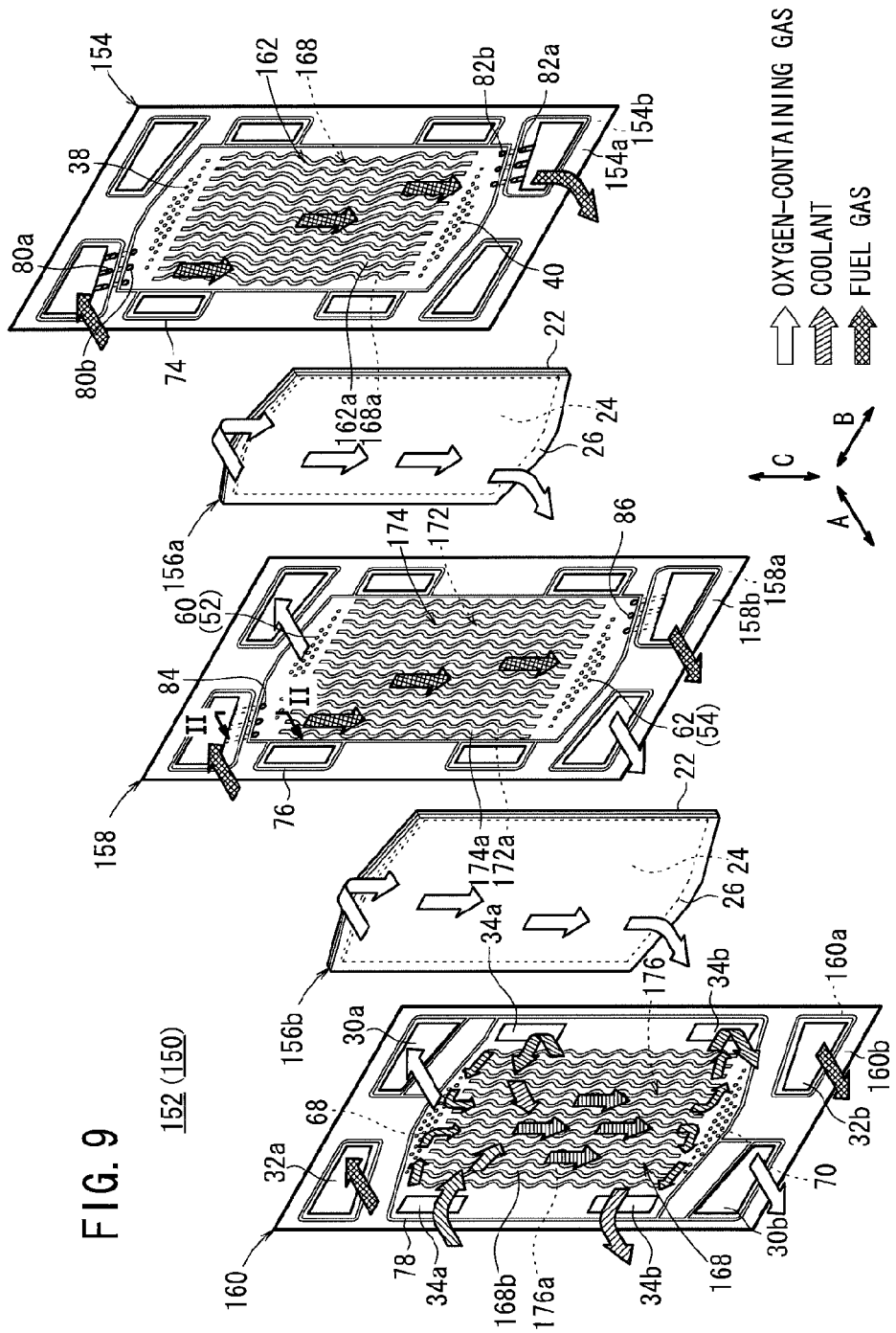
FIG. 9 is an exploded perspective view showing main components of a power generation unit of a fuel cell stack according to a fifth embodiment of the present invention.

FIG. 9 is an exploded perspective view showing main components of a power generation unit 152 of a fuel cell stack 150 according to a fifth embodiment of the present invention.

The power generation unit 152 includes a first metal separator 154, a first membrane electrode assembly 156a, a second metal separator 158, a second membrane electrode assembly 156b, and a third metal separator 160.

The first metal separator 154 includes a first fuel gas flow field 162 on its surface 154a facing the first membrane electrode assembly 156a. The first fuel gas flow field 162 connects a fuel gas supply passage 32a and a fuel gas discharge passage 32b. The first fuel gas flow field 162 includes a plurality of corrugated flow grooves 162a extending in a direction indicated by an arrow C.

Figure 10:
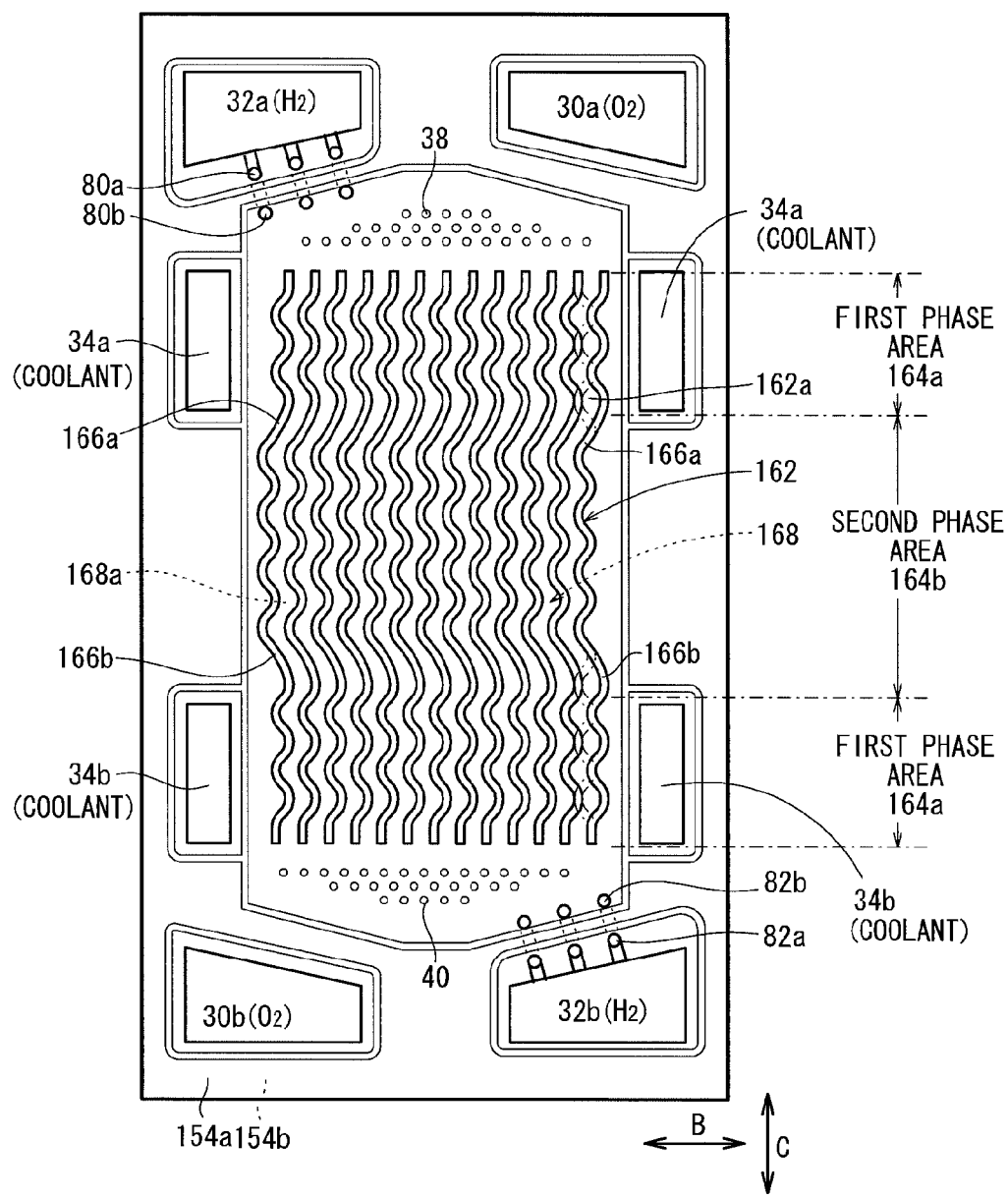
FIG. 10 is a front view showing a first metal separator of the power generation unit.

As shown in FIG. 10, the corrugated flow grooves 162a include first phase areas 164a having the same phase and which are arranged respectively on the upstream side (upper side) and on the downstream side (lower side), and a second phase area 164b having a phase which is reverse to the phase of the first phase areas 164a and which is reversed through phase reversing sections 166a, 166b. The phase reversing sections 166a, 166b form a corrugated flow field shifted by a half pitch by reversing the phase at the central region as shown by dotted lines in FIG. 10, in midstream.

A coolant flow field 168 connecting a pair of coolant supply passages 34a and a pair of coolant discharge passages 34b is partially formed on a surface 154b of the first metal separator 154. On the surface 154b, a plurality of corrugated flow grooves 168a are formed as the back surface of a plurality of corrugated flow grooves 162a of the first fuel gas flow field 162.

Figure 11:
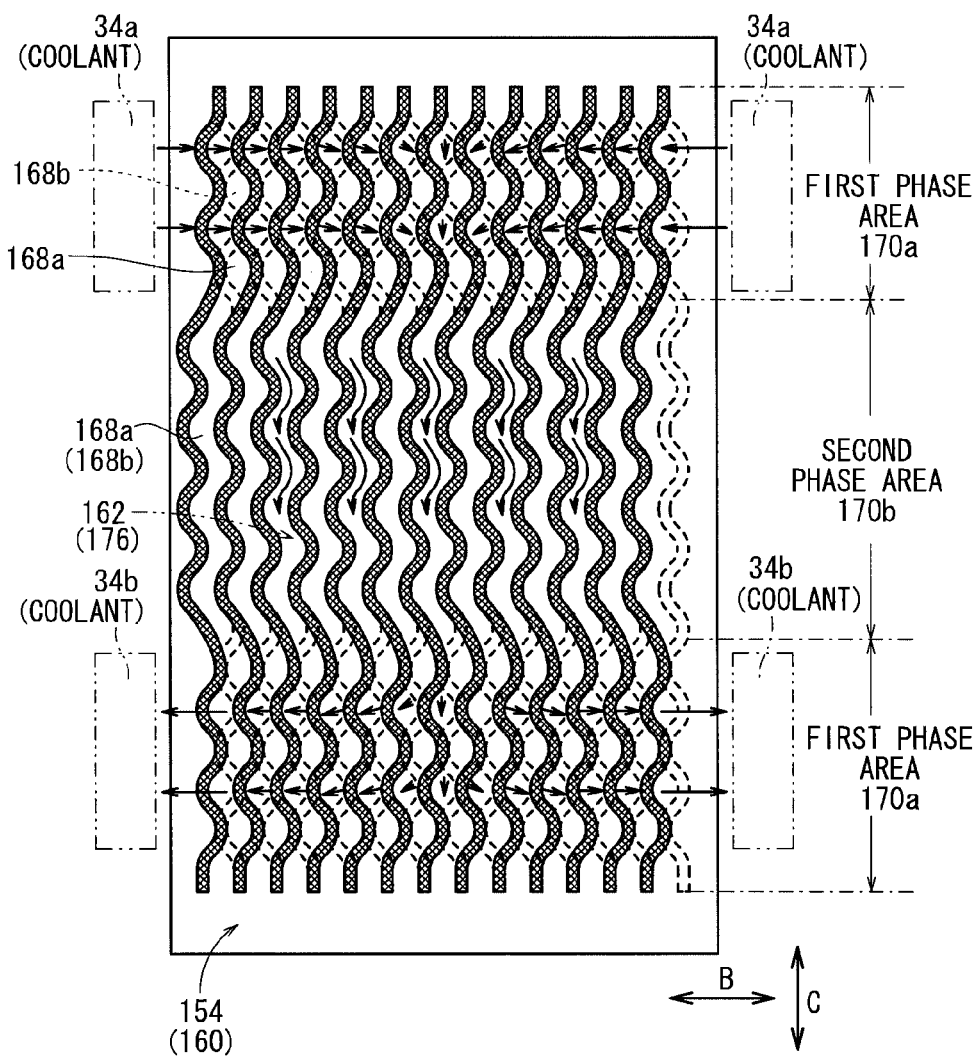
FIG. 11 is a view showing a coolant flow field formed between power generation units.

As schematically shown in FIG. 11, the corrugated flow grooves 168a are formed between ridges on the back surface of the corrugated flow grooves 162a. First phase areas 170a are provided on the upstream side (upper side) and the downstream side (lower side) of the corrugated flow grooves 168a, and a second phase area 170b in the reversed phase is formed in the intermediate area thereof.

As shown in FIG. 9, the second metal separator 158 has a first oxygen-containing gas flow field 172 on its surface 158a facing the first membrane electrode assembly 156a. The first oxygen-containing gas flow field 172 connects the oxygen-containing gas supply passage 30a and the oxygen-containing gas discharge passage 30b. The first oxygen-containing gas flow field 172 includes a plurality of corrugated flow grooves 172a extending in the direction indicated by the arrow C.

Figure 12:
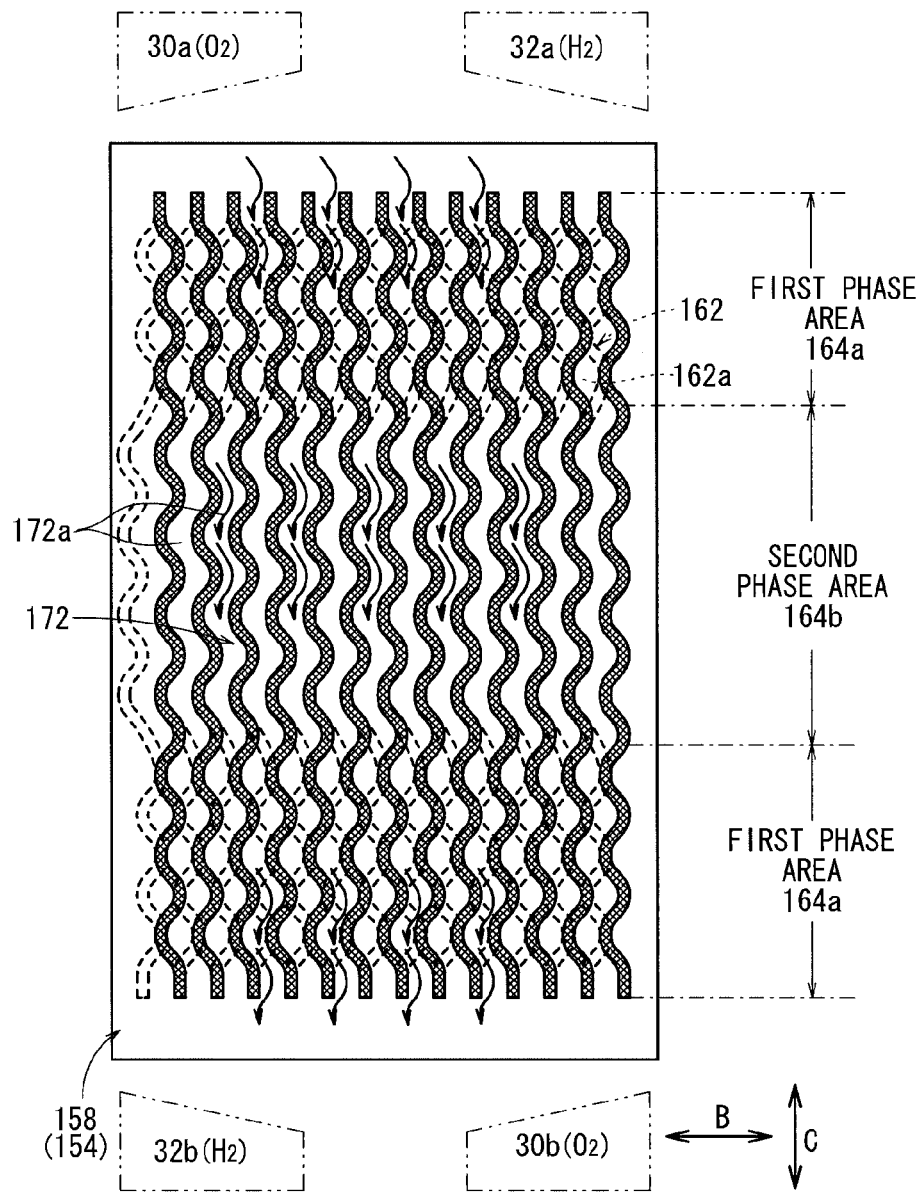
FIG. 12 is a transparent view showing a first fuel gas flow field and a first oxygen-containing gas flow field of the power generation unit.

As shown in FIG. 12, the corrugated flow grooves 172a face the corrugated flow grooves 162a of the first fuel gas flow field 162. In the first phase areas 164a, the corrugated flow grooves 172a and the corrugated flow grooves 162a are set at different phases. In the second phase area 164b, the corrugated flow grooves 172a and the corrugated flow grooves 162a are set at the same phase.

The second metal separator 158 has a second fuel gas flow field 174 on its surface 158b facing the second membrane electrode assembly 156b. The second fuel gas flow field 174 connects the fuel gas supply passage 32a and the fuel gas discharge passage 32b. As shown in FIG. 9, the second fuel gas flow field 174 includes a plurality of corrugated flow grooves 174a extending in the direction indicated by the arrow C.

The third metal separator 160 has a second oxygen-containing gas flow field 176 on its surface 160a facing the second membrane electrode assembly 156b. The second oxygen-containing gas flow field 176 connects the oxygen-containing gas supply passage 30a and the oxygen-containing gas discharge passage 30b. The second oxygen-containing gas flow field 176 includes a plurality of corrugated flow grooves 176a extending in the direction indicated by the arrow C. The corrugated flow grooves 176a face the corrugated flow grooves 174a. The corrugated flow grooves 176a and the corrugated flow grooves 174a are set at the same phase.

The coolant flow field 168 is partially formed on the surface 160b of the third metal separator 160. On the surface 160b, a plurality of corrugated flow grooves 168b are formed as the back surface of the corrugated flow grooves 176a of the second oxygen-containing gas flow field 176.

As shown in FIG. 11, the corrugated flow grooves 168a of the first metal separator 154 and the corrugated flow grooves 168b of the third metal separator 160 are overlapped with each other to form the coolant flow field 168.

In the first phase areas 170a, the corrugated flow grooves 168a and the corrugated flow grooves 168b are in different phases. In the second phase area 170b, the corrugated flow grooves 168a and the corrugated flow grooves 168b are in the same phase, and form a corrugated flow field extending in the direction indicated by the arrow C.

In each of the first phase areas 170a at the upper and lower positions, the corrugated flow grooves 168a and the corrugated flow grooves 168b are in different phases thereby to form a flow field extending in the direction indicated by the arrow B.

Figure 13:
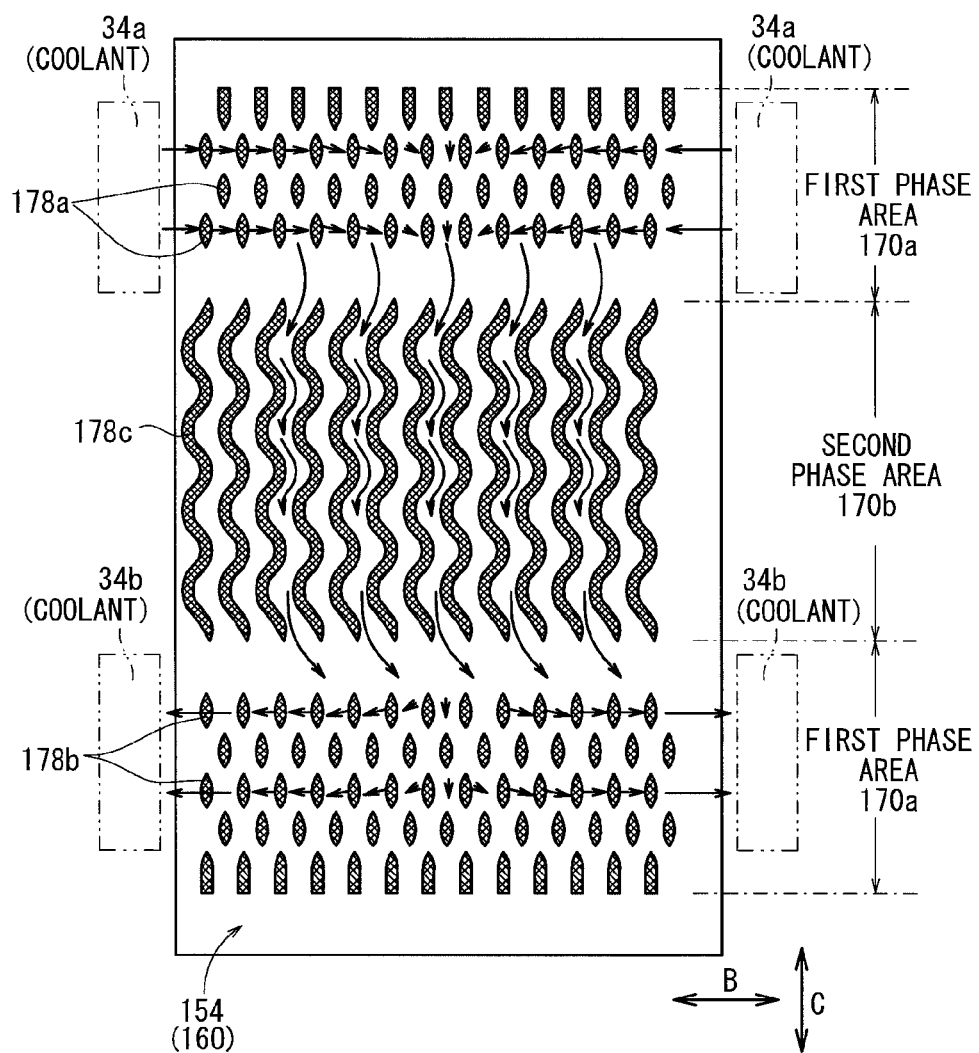
FIG. 13 is a view showing contact areas of the coolant flow field.

As shown in FIG. 13, the surface 154b of the first metal separator 154 and the surface 160b of the third metal separator 160 are overlapped with each other. Thus, ridges on the back surfaces forming the coolant flow field 168 contact each other to provide an upper contact area 178a, a lower contact area 178b, and an intermediate contact area 178c.

In the upper contact area 178a and the lower contact area 178b, the ridges on the back surfaces are in different phases, and thus are placed in point-contact with each other. In the intermediate contact area 178c, the ridges on the back surfaces are in the same phase thereby to form a flow field including a plurality of corrugated flow grooves extending in the direction indicated by the arrow C, between the respective ridges in the intermediate contact area 178c.

In the fifth embodiment, as shown in FIG. 11, in the first phase area (upstream area) 170a adjacent to the coolant supply passages 34a and in the first phase area (downstream area) 170a adjacent to the coolant discharge passages 34b, the corrugated flow grooves 168a of the coolant flow field 168 and the corrugated flow grooves 168b thereof are set at different phases.

Further, in the second phase area (intermediate area) 170b of the corrugated flow grooves 168a, the corrugated flow grooves 168a and the corrugated flow grooves 168b are in the same phase. Thus, in the intermediate area of the coolant flow field 168, the flow direction of the coolant is the same as the flow direction of (at least one of) the oxygen-containing gas and the fuel gas. In the upstream area and the downstream area, the flow direction can be changed to a direction (indicated by the arrow B) intersecting the flow direction indicated by the arrow C. This is because, as shown in FIG. 13, in each of the upstream area and the downstream area, the upper contact area 178a and the lower contact area 178b are in point-contact with each other.

Thus, the coolant supply passages 34a and the coolant discharge passages 34b can be formed on opposite left and right sides of the power generation units 152. In the structure, the width of the power generation unit 152 indicated by the arrow B is reduced effectively.

In particular, the coolant supply passages 34a and the coolant discharge passages 34b are disposed within the area of the spacing interval H in a horizontal direction indicated by the arrow B between the oxygen-containing gas supply passage 30a (oxygen-containing gas discharge passage 30b) and the fuel gas supply passage 32a (fuel gas discharge passage 32b). In the structure, the width of the power generation unit 12 can be reduced as much as possible.

Further, in the intermediate area of the coolant flow field 168, the corrugated flow grooves 168a, 168b are set at the same phase. Therefore, the coolant can flow smoothly and reliably in the same direction as the flow direction of the oxygen-containing gas and the fuel gas. Thus, improvement in the efficiency of cooling the power generation unit 152 is achieved suitably.

As the power generation unit 152, a power generation unit formed by sandwiching one electrolyte electrode assembly between a pair of metal separators may be used, and the coolant flow field may be formed between the adjacent power generation units.

Figure 14:
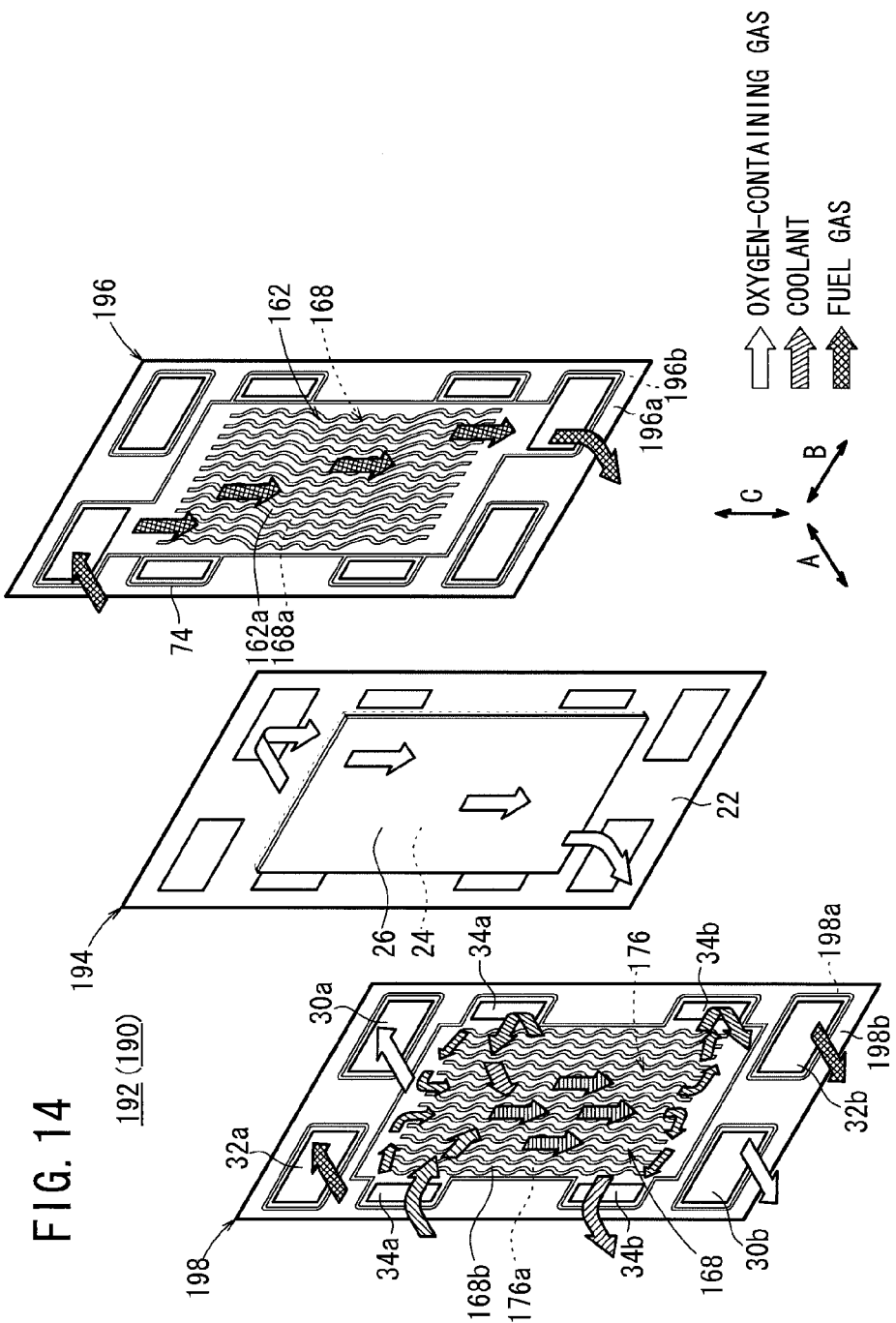
FIG. 14 is an exploded perspective view showing main components of a power generation unit of a fuel cell stack according to a sixth embodiment of the present invention.

FIG. 14 is an exploded perspective view showing main components of a power generation unit 192 of a fuel cell stack 190 according to a sixth embodiment of the present invention.

The power generation unit 192 is formed by sandwiching a membrane electrode assembly 194 between a first metal separator 196 and a second metal separator 198. The membrane electrode assembly 194 includes an anode 24, a cathode 26, and a solid polymer electrolyte membrane 22 interposed between the anode 24 and the cathode 26. The surface area of the anode 24 is the same as the surface area of the cathode 26.

A first fuel gas flow field 162 is formed on a surface 196a of the first metal separator 196 facing the membrane electrode assembly 194. On a surface 196b of the first metal separator 196, corrugated flow grooves 168a of the coolant flow field 168 are formed as the back surface of the first fuel gas flow field 162.

A second oxygen-containing gas flow field 176 is formed on a surface 198a of the second metal separator 198 facing the membrane electrode assembly 194. On a surface 198b of the second metal separator 198, corrugated flow grooves 168b of the coolant flow field 168 are formed as the back surface of the second oxygen-containing gas flow field 176.

The coolant flow field 168 is formed between the adjacent power generation units 192, i.e., between a surface 196b of the first metal separator 196 of one of the adjacent power generation units 192, and a surface 198b of the second metal separator 198 of the other of the adjacent power generation units 192.

In the sixth embodiment, the coolant flow field 168 is formed by the back surface of the first fuel gas flow field 162 and the back surface of the second oxygen-containing gas flow field 176. Thus, the same advantages as in the case of the fifth embodiment are obtained.

In the fifth and sixth embodiments, the fuel gas and the oxygen-containing gas flow in parallel to each other (i.e., in the same direction). However, the present invention is not limited in this respect. For example, the fuel gas and the oxygen-containing gas may flow in a counterflow manner (i.e., in opposite directions).

Figure 15:
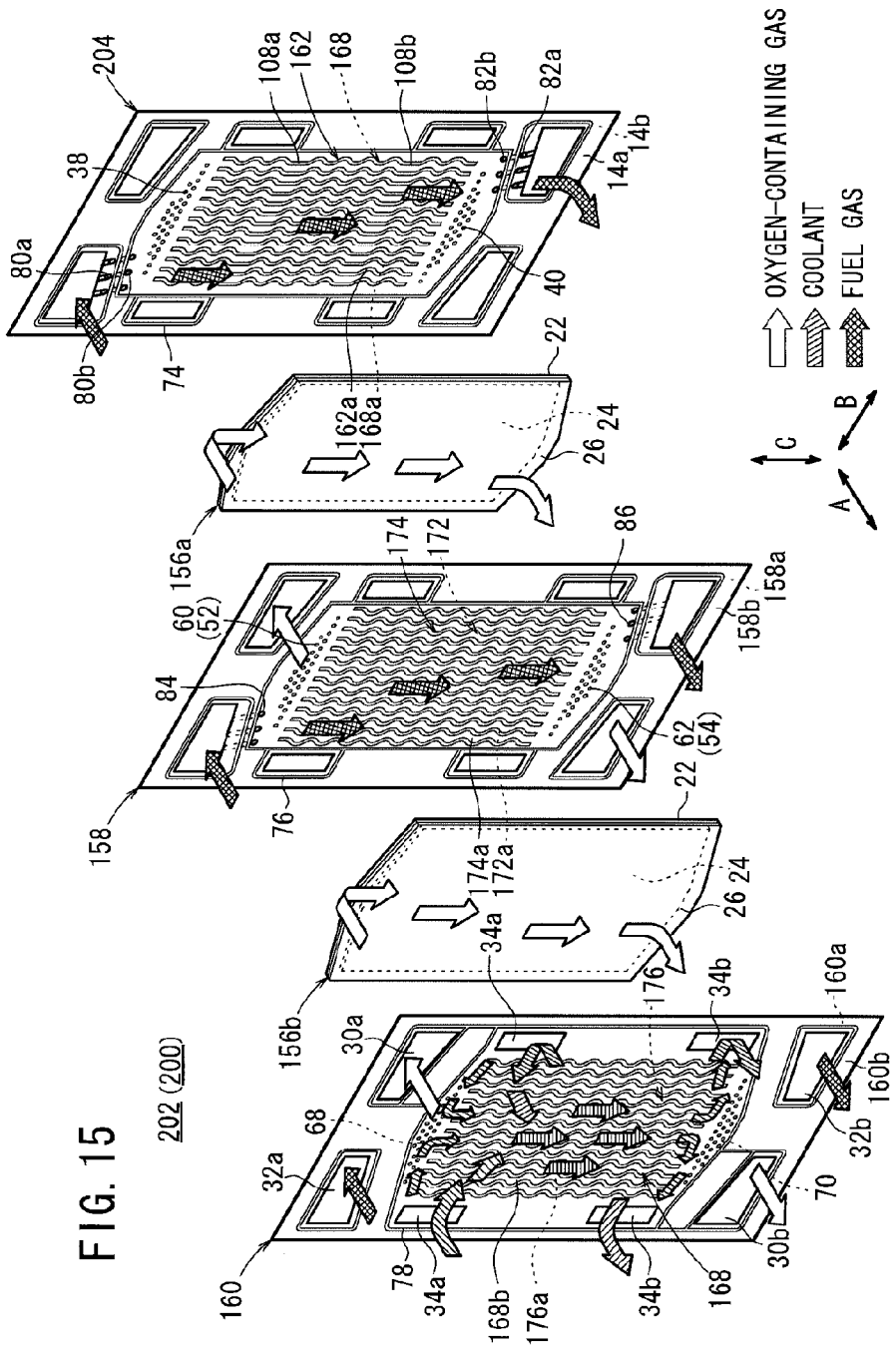
FIG. 15 is an exploded perspective view showing main components of a power generation unit of a fuel cell stack according to a seventh embodiment of the present invention.

FIG. 15 is an exploded perspective view showing main components of a power generation unit 202 of a fuel cell stack 200 according to a seventh embodiment of the present invention.

The power generation unit 202 includes a first metal separator 204, a first membrane electrode assembly 156a, a second metal separator 158, a second membrane electrode assembly 156b, and a third metal separator 160.

Figure 16:
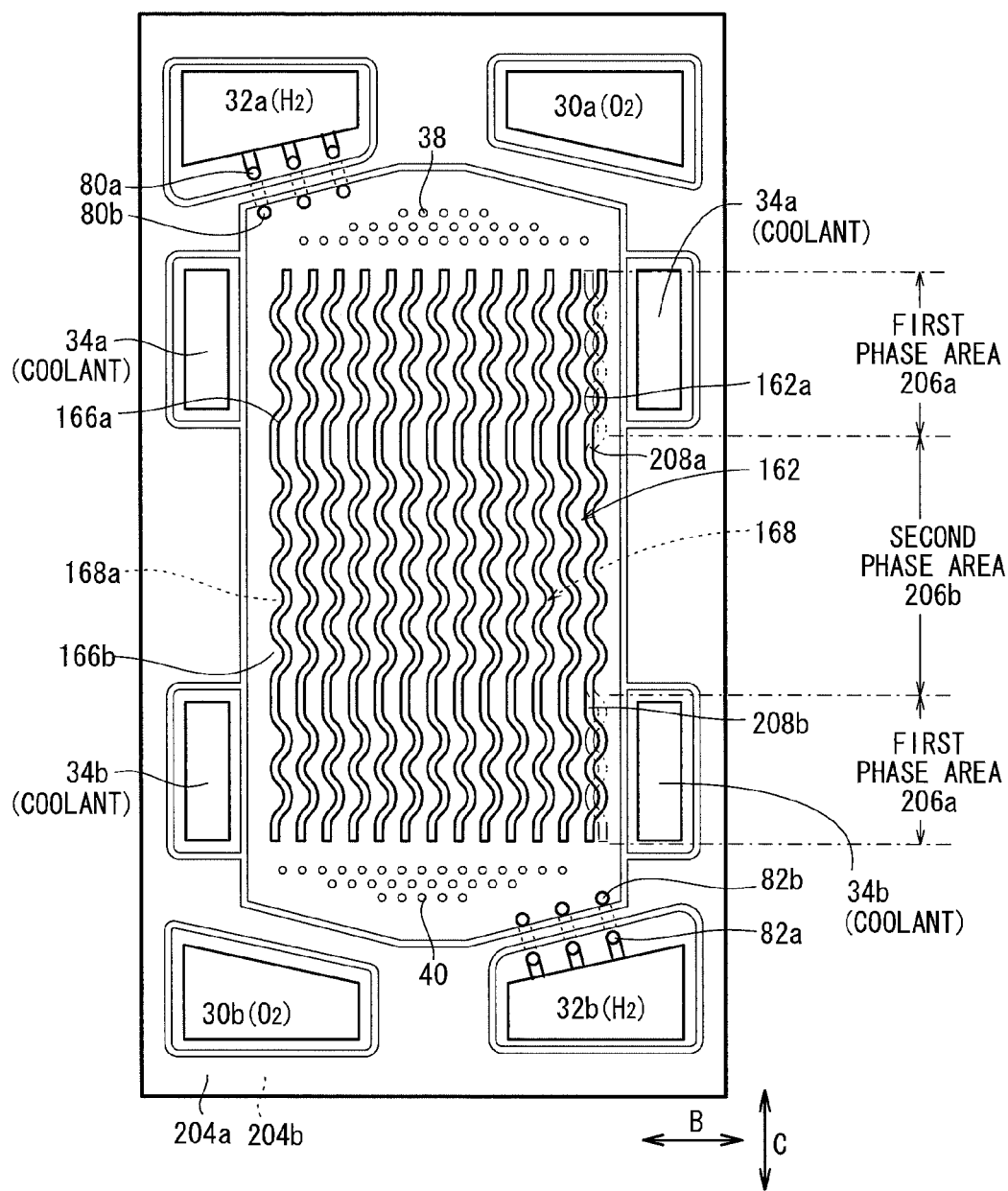
FIG. 16 is a front view showing a first metal separator of the power generation unit.

As shown in FIGS. 15 and 16, the first metal separator 204 has a first fuel gas flow field 162 on its surface 204a facing the first membrane electrode assembly 156a. The first fuel gas flow field 162 connects the fuel gas supply passage 32a and the fuel gas discharge passage 32b.

In the corrugated flow grooves 162a of the first fuel gas flow field 162, on the upstream side (upper side) and on the downstream side (lower side), the first phase areas 206a having the same phase are provided, and in the intermediate area, the second phase area 206b subjected to a phase shift by a half phase through the straight sections 208a, 208b are provided. The straight sections 208a, 208b form corrugated flow grooves where the phase on the lower side as shown by the two-dot chain lines in FIG. 16 is shifted by a half pitch in the middle.

Figure 17:
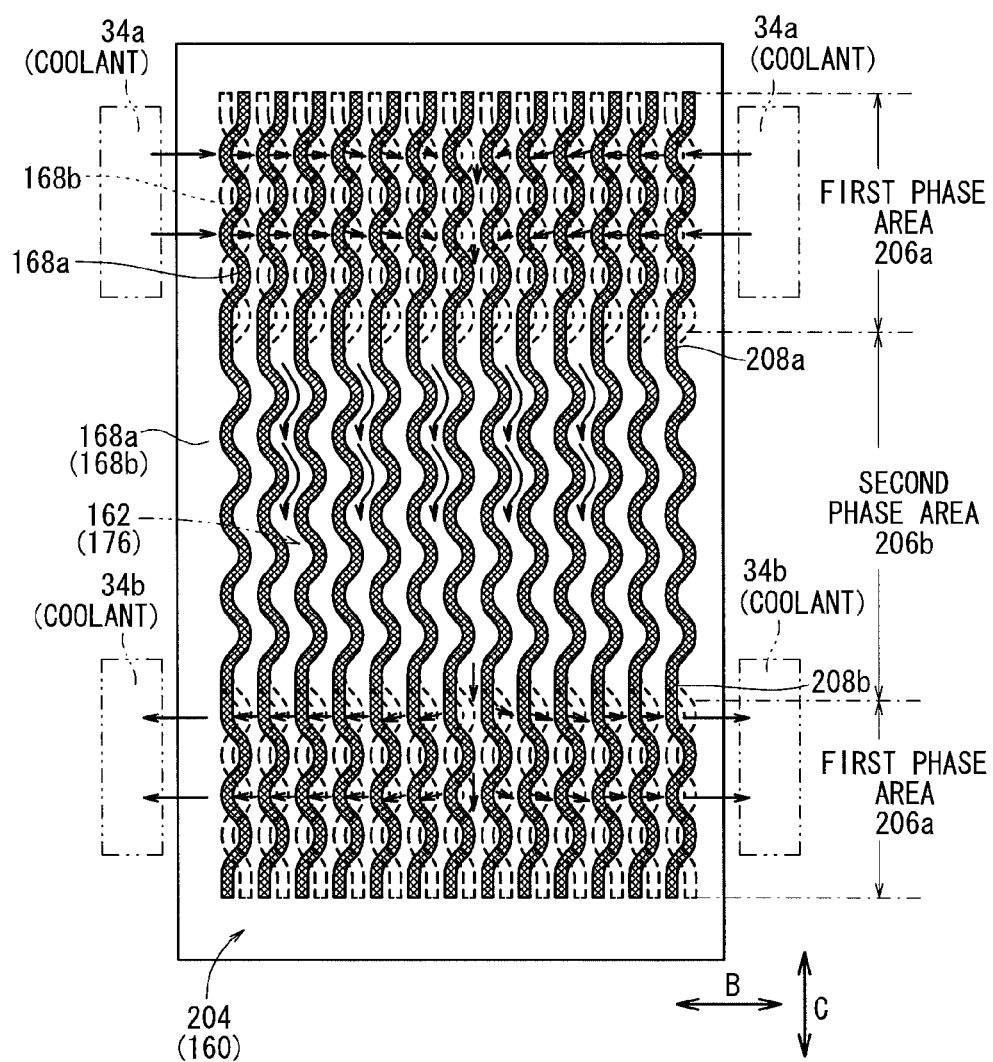
FIG. 17 is a view showing a coolant flow field formed between the power generation units.

As shown in FIG. 17, the corrugated flow grooves 168a of the first metal separator 204 are overlapped with the corrugated flow grooves 168b of the third metal separator 160 to form the coolant flow field 168.

In the first phase areas 206a, the corrugated flow grooves 168a and the corrugated flow grooves 168b are in the different phases. In the second phase area 206b, the corrugated flow grooves 168a and the corrugated flow grooves 168b form a corrugated flow field having the same phase, and extending in the direction indicated by the arrow C.

Figure 18:
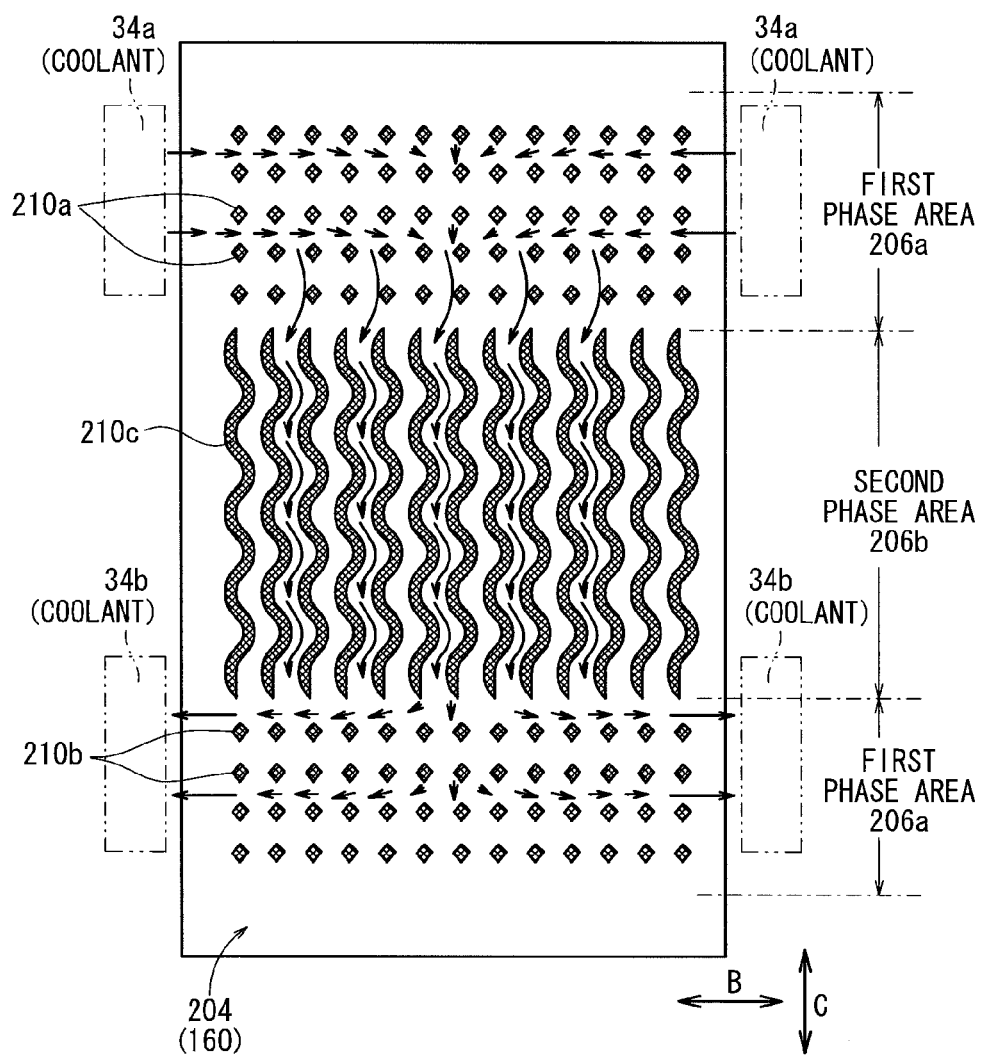
FIG. 18 is a view showing contact areas of the coolant flow field.
Figure 19:
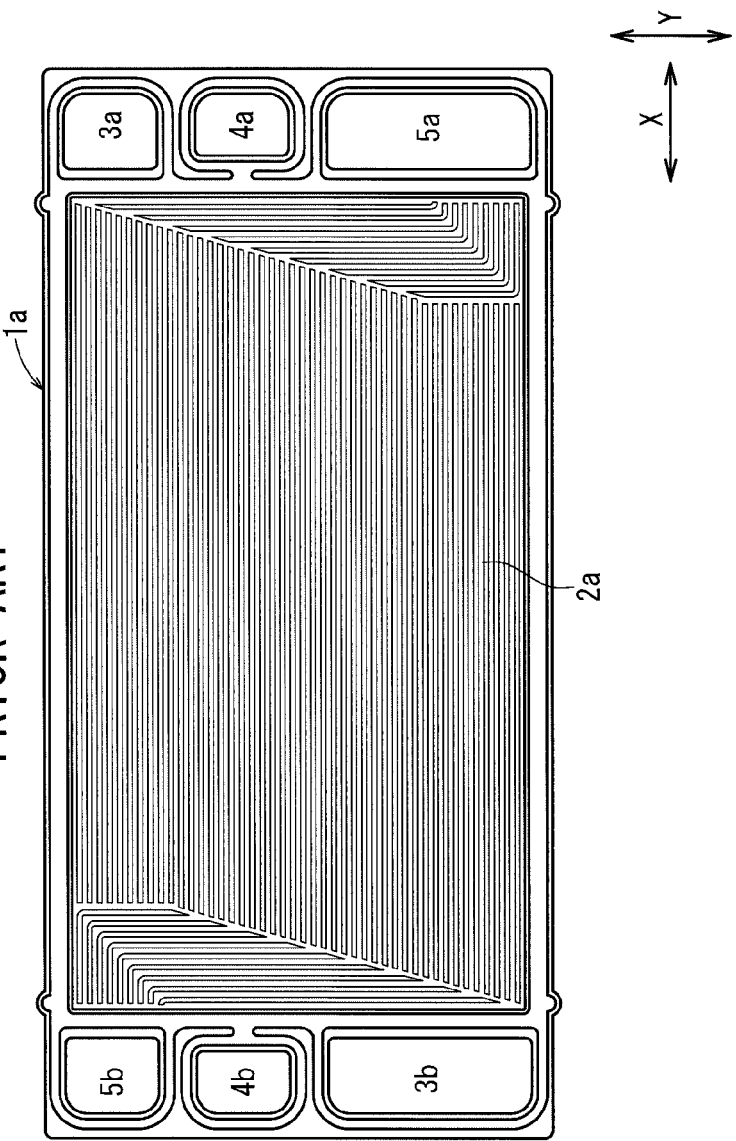
FIG. 19 is a view showing an anode flow field plate disclosed in Japanese Laid-Open Patent Publication No. 2008-536258 (PCT)
Figure 20:
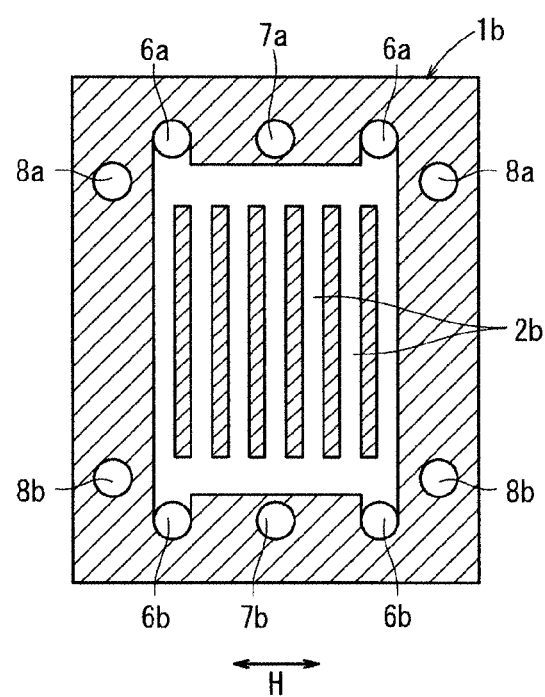
FIG. 20 is a view showing a separator of a fuel cell disclosed in Japanese Laid-Open Patent Publication No. 09-161819.

As shown in FIG. 18, the surface 204b of the first metal separator 204 and the surface 160b of the third metal separator 160 are overlapped with each other. Thus, ridges on the back surfaces forming the coolant flow field 168 contact each other thereby to provide an upper contact section 210a, a lower contact section 210b, and an intermediate contact section 210c.

In the upper contact section 210a and the lower contact section 210b, ridges on the back surfaces are in different phases, i.e., the ridges are in point-contact with each other. In the intermediate contact section 210c, ridges on the back surfaces are in the same phase. Therefore, the intermediate contact section 210c has a corrugated shape extending in the direction indicated by the arrow C. A plurality of corrugated flow grooves extending in the direction indicated by the arrow C are formed between the ridges of the intermediate contact section 210c.

Thus, in the seventh embodiment, the coolant supply passages 34a and the coolant discharge passages 34b are formed on left and right opposite sides of the power generation unit 202. Further, the same advantages as in the case of the fifth and sixth embodiments are obtained. For example, the coolant can be supplied in the same direction as the flow direction of the oxygen-containing gas and the fuel gas smoothly and reliably.

The invention claimed is:

1. A fuel cell stack formed by stacking power generation units together, the power generation units each being formed by stacking an electrolyte electrode assembly and a metal separator having a rectangular shape elongated longitudinally, the electrolyte electrode assembly including a pair of electrodes and an electrolyte interposed between the electrodes, the fuel cell stack comprising:
    a gas flow field formed on a surface of the metal separator facing the electrode for supplying a fuel gas or an oxygen-containing gas as a reactant gas along the electrode, the gas flow field including wavelike grooves along the surface of the metal separator;
    a single coolant flow field including wavelike grooves formed as a back surface of the wavelike grooves in the gas flow field, between the power generation units;
    reactant gas supply passages and reactant gas discharge passages for flowing the reactant gases and which extend through opposite first and second longitudinal sides of the metal separator in a stacking direction, wherein one or more of the reactant supply passages are formed on the first longitudinal side of the metal separator and one or more of the reactant discharge passages are formed on the opposed second longitudinal side of the metal separator, wherein each of the opposed first and second longitudinal sides of the metal separator are separated in a longitudinal direction; and
    a pair of coolant supply passages forming a first coolant supply passage and a second coolant supply passage and a pair of coolant discharge passages forming a first coolant discharge passage and a second coolant discharge passage for flowing a coolant at least in part in a direction parallel to the reaction gases in the single coolant flow field and which extend through opposite lateral sides of the metal separator in the stacking direction and being positioned adjacent to at least the reactant gas supply passages and the reactant gas discharge passages, wherein the lateral sides includes a first lateral side and an opposed second lateral side which are separated in a lateral direction and the lateral sides and the longitudinal sides compose the four sides of the metal separator, wherein the first coolant supply passage is disposed on the first lateral side of the metal separator and the second coolant supply passage is disposed on the second lateral side of the metal separator opposite the first lateral side, and the first coolant discharge passage is disposed on the first lateral side of the metal separator and the second coolant discharge passage is disposed on the second lateral side opposite the first lateral side such that the first and second coolant supply passages are disposed along the opposed first and second lateral sides at a position adjacent to the one or more of the reactant supply passages formed on the first longitudinal side and the first and second coolant discharge passages are disposed along the opposed first and second lateral sides adjacent to the one or more of the reactant discharge passages formed on the second longitudinal side, wherein the location of the first and second coolant supply passages enables the coolant to flow into the same coolant flow field from opposite directions from the first and second lateral sides of the metal separator to form a temperature gradient between the coolant supply passages and the coolant discharge passages.

2. The fuel cell stack according to claim 1, wherein
an oxygen-containing gas supply passage and a fuel gas supply passage serving as the reactant gas supply passages extend through an end of one of the opposite longitudinal sides of the metal separator in the longitudinal direction of the metal separator;
an oxygen-containing gas discharge passage and a fuel gas discharge passage serving as the reactant gas discharge passages extend through an end of the other of the opposite longitudinal sides of the metal separator in the longitudinal direction;
the pair of the coolant supply passages are positioned by the gas flow field and adjacent to the oxygen-containing gas supply passage and the fuel gas supply passage of the metal separator, and are disposed separately in the lateral direction of the metal separator; and
the pair of the coolant discharge passages are positioned by the gas flow field and adjacent to the oxygen-containing gas discharge passage and the fuel gas discharge passage of the metal separator, and are disposed separately in the lateral direction.

3. The fuel cell stack according to claim 1, wherein the metal separator is elongated longitudinally in the direction of gravity, and the metal separator and the electrolyte electrode assembly are stacked in a horizontal direction.

4. The fuel cell stack according to claim 1, wherein
an oxygen-containing gas supply passage serving as the reactant gas supply passage and a fuel gas discharge passage serving as the reactant gas discharge passage extend through an end of one of the opposite longitudinal sides of the metal separator in the longitudinal direction of the metal separator and are opposed from each other; and
an oxygen-containing gas discharge passage serving as the reactant gas discharge passage and a fuel gas supply passage serving as the reactant gas supply passage extend through an end of the other of the opposite longitudinal sides of the metal separator in the longitudinal direction and are opposed from each other;
one of the pair of the coolant supply passages and one of the pair of the coolant discharge passages are positioned by the gas flow field on the same lateral side of the metal separator and adjacent to the oxygen-containing gas supply passage and the fuel gas discharge passage of the metal separator; and
the other of the pair of the coolant discharge passages and the other of the pair of the coolant supply passages are positioned by the gas flow field on the same lateral side and adjacent to the oxygen-containing gas discharge passage and the fuel gas supply passage of the metal separator.

5. The fuel cell stack according to claim 1, wherein the metal separator is elongated longitudinally in a horizontal direction, and the metal separator and the electrolyte electrode assembly are stacked in the direction of gravity.

6. The fuel cell stack according to claim 1, wherein an inlet buffer is provided at a position connecting the gas flow field and the reactant gas supply passage, an outlet buffer is provided at a position connecting the gas flow field and the reactant gas discharge passage, and in the coolant flow field, the coolant flows at least through the back surface of the outlet buffer.

7. The fuel cell stack according to claim 2, wherein the pair of the coolant supply passages and the pair of the coolant discharge passages are positioned within a spacing interval in the lateral direction between an outer end of an opening of at least the oxygen-containing gas supply passage or the oxygen-containing gas discharge passage and an outer end of an opening of at least the fuel gas supply passage or the fuel gas discharge passage.

\* \* \* \* \*